US 11,758,918 B2

(12) United States Patent
Ambrecht et al.

(10) Patent No.: US 11,758,918 B2
(45) Date of Patent: Sep. 19, 2023

(54) METHODS AND APPARATUS FOR PROCESSING CHOCOLATE

(71) Applicants: Adam D. Ambrecht, Kennesaw, GA (US); Jessica Claire Halstead, Indianapolis, IN (US); Matthew J. Rubin, Indianapolis, IN (US); Martin Weibye, Parkers Prairie, MN (US)

(72) Inventors: Adam D. Ambrecht, Kennesaw, GA (US); Jessica Claire Halstead, Indianapolis, IN (US); Matthew J. Rubin, Indianapolis, IN (US); Martin Weibye, Parkers Prairie, MN (US)

(73) Assignee: Trade Secret Chocolates, Indianapolis, IN (US)

( * ) Notice: Subject to any disclaimer, the term of this patent is extended or adjusted under 35 U.S.C. 154(b) by 206 days.

(21) Appl. No.: 17/168,304

(22) Filed: Feb. 5, 2021

(65) Prior Publication Data

US 2021/0186046 A1 Jun. 24, 2021

Related U.S. Application Data

(63) Continuation of application No. 15/989,840, filed on May 25, 2018, now Pat. No. 10,925,294.

(60) Provisional application No. 62/534,715, filed on Jul. 20, 2017, provisional application No. 62/511,720, filed on May 26, 2017.

(51) Int. Cl.
*A23G 1/00* (2006.01)
*A23G 1/06* (2006.01)

(52) U.S. Cl.
CPC ............ *A23G 1/002* (2013.01); *A23G 1/003* (2013.01); *A23G 1/0026* (2013.01); *A23G 1/06* (2013.01)

(58) Field of Classification Search
CPC ...... A23G 1/002; A23G 1/0026; A23G 1/003; A23G 1/06
USPC ......................................................... 426/271
See application file for complete search history.

(56) References Cited

U.S. PATENT DOCUMENTS

| 1,596,860 | A | 8/1926 | Jacques |
| 3,193,985 | A * | 7/1965 | Siggelin ................ F24F 3/1429 95/125 |
| 3,722,834 | A | 3/1973 | Bakewell |
| 4,087,053 | A | 5/1978 | Voglesonger |
| 5,320,284 | A | 6/1994 | Nishida |
| 6,193,407 | B1 | 2/2001 | Kubicz |
| 7,371,004 | B1 | 5/2008 | Branson, III |
| 2005/0122837 | A1 | 6/2005 | Bravard |

(Continued)

*Primary Examiner* — Hamid R Badr
(74) *Attorney, Agent, or Firm* — C. John Brannon; Brannon Sowers & Cracraft PC

(57) ABSTRACT

Systems and methods for processing food products. One aspect is a system for processing food products including a base member, a vessel member defining a vessel volume, an opening formed through the vessel member, a vessel lip surrounding the opening; a vessel lid connected to the vessel member to substantially seal the opening; a motor shaft, at least one mixing member connected to the motor shaft and within the vessel volume; a motor connected to the motor shaft; and grinding media within the vessel volume for grinding and mixing food products, where energizing the motor urges the motor shaft and the at least one mixing member to rotate within the vessel volume to agitate the grinding media; and where the grinding media includes first grinding media and second grinding media.

12 Claims, 21 Drawing Sheets

(56) References Cited

U.S. PATENT DOCUMENTS

2006/0121175 A1* 6/2006 Hanselmann ............ A23G 1/50
426/631
2012/0018561 A1 1/2012 Wulf
2016/0205963 A1* 7/2016 Saal ........................ A23G 1/10

* cited by examiner

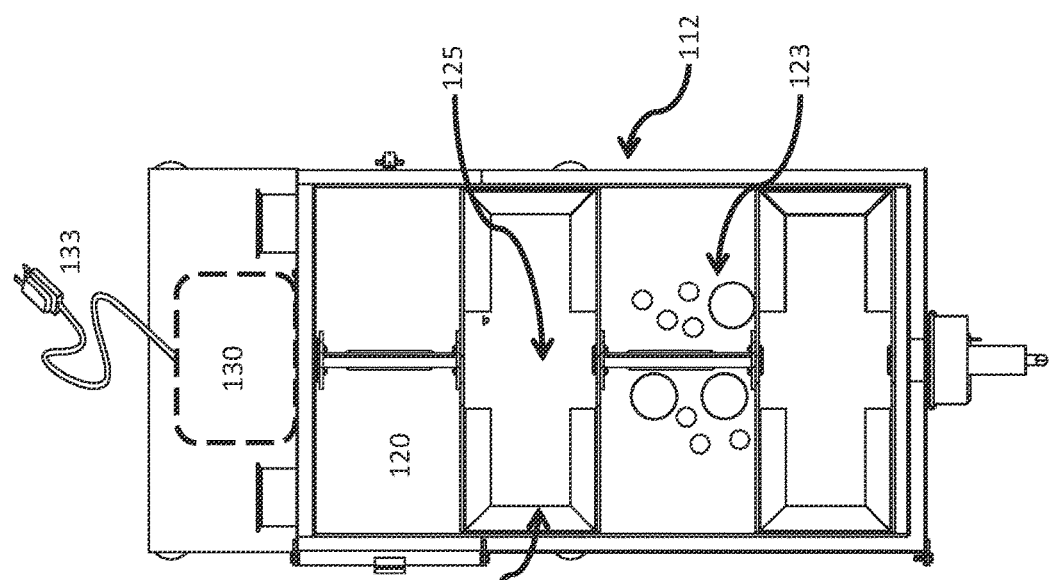
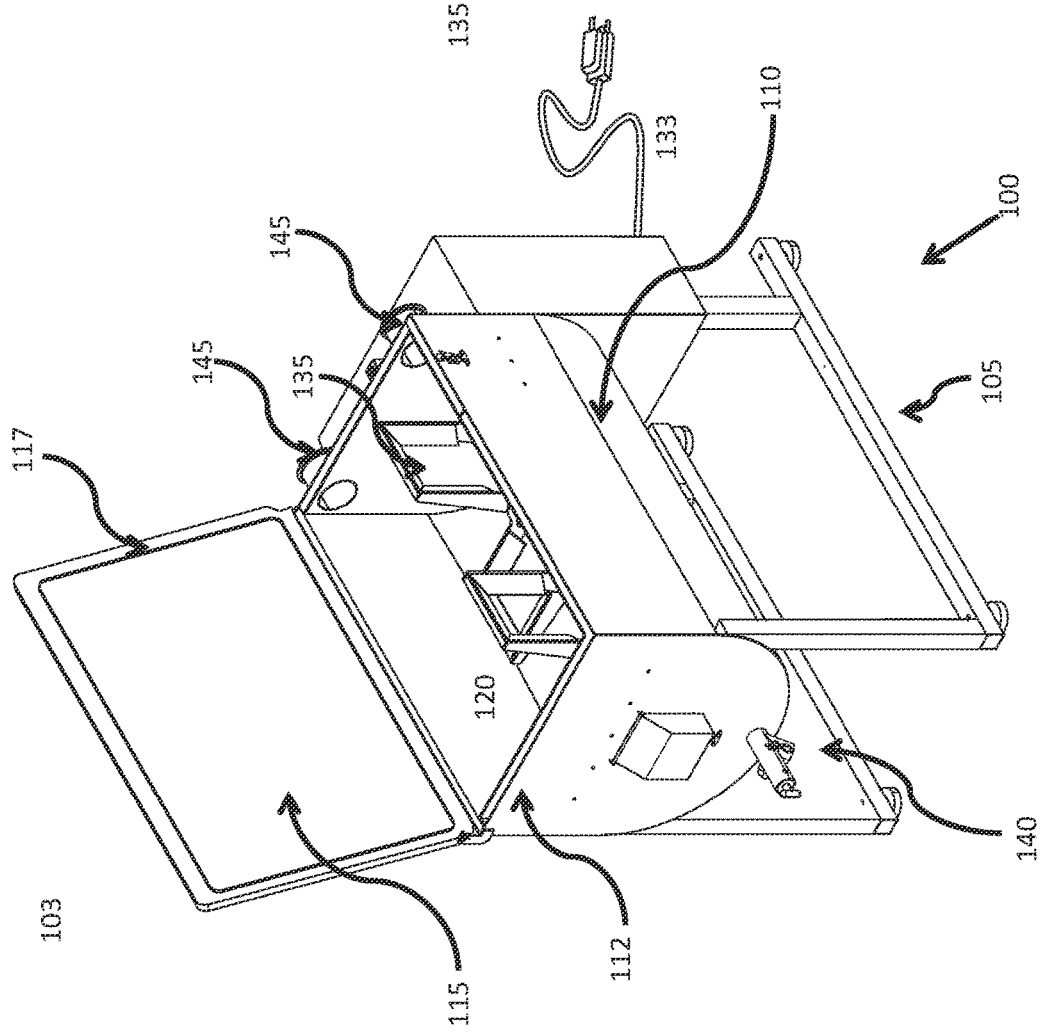

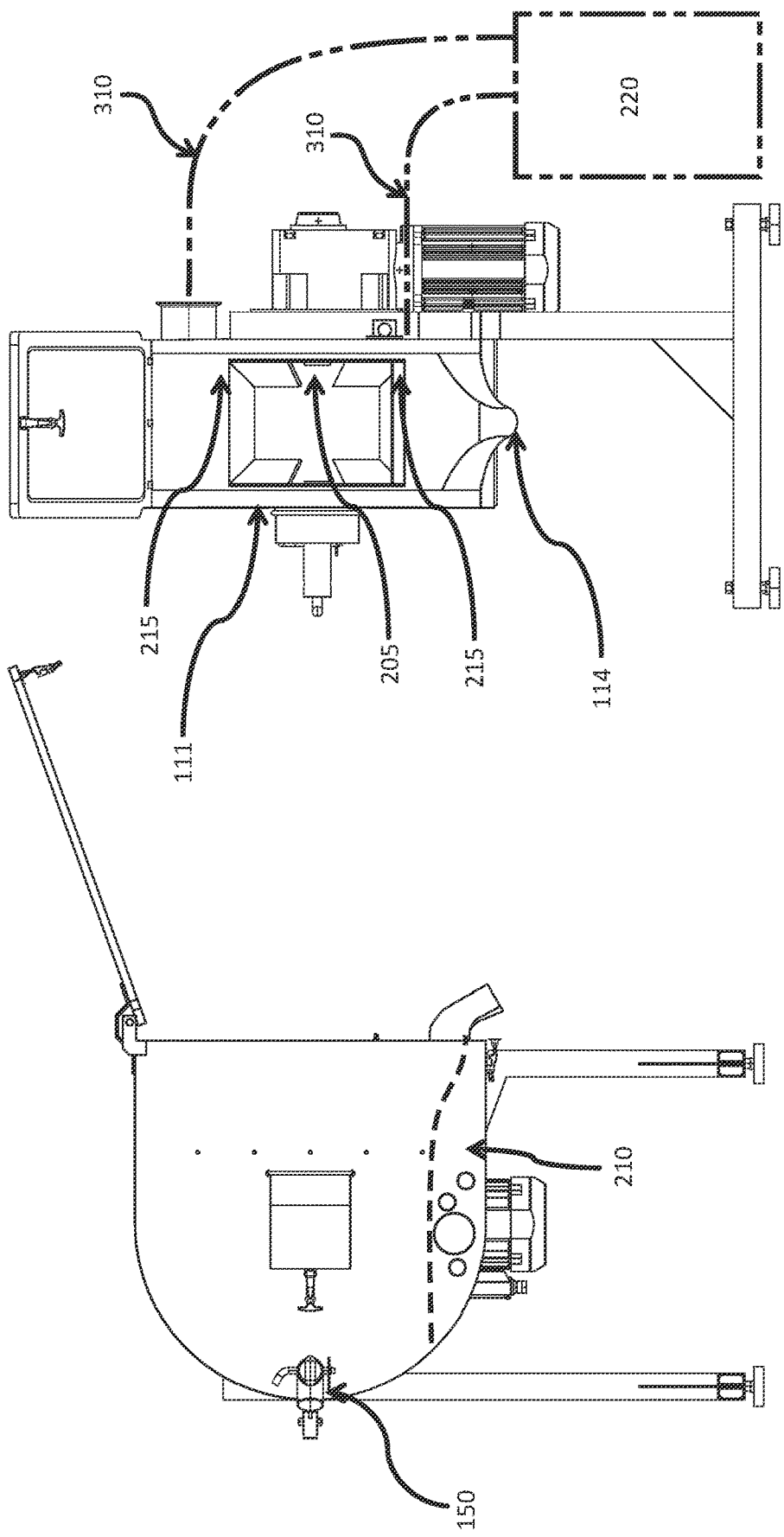

METHODS AND APPARATUS FOR PROCESSING CHOCOLATE

CROSS-REFERENCE TO RELATED APPLICATIONS

This application is a continuation of co-pending U.S. patent application Ser. No. 15/989,840, filed on May 25, 2018, which claimed the benefit under 35 U.S.C. § 119(e) of U.S. Provisional Patent Application No. 62/511,720, filed May 26, 2017, and U.S. Provisional Patent Application No. 62/534,715, filed Jul. 20, 2017, which are incorporated herein by reference in their entirety.

TECHNICAL FIELD

This novel technology relates to the field of food ingredient preparation. More specifically, the present technology is in the technical field of processing food products, such as cacao, into chocolate.

BACKGROUND

Cacao beans typically are ground and processed conventionally using several transfer steps and separate machines to process chocolate from nibs to a finished product. These grinders often have high space and environmental requirements, typically being extremely complex and difficult to maintain. They are also typically single-mindedly constructed, such that the grinder will process all materials from a single particle size to a second particle size, typically having multiple iteration steps to further decrease particle size by five to ten times each, usually using either high- or low-shear processes, but without the ability to select, alter, or partially process loads. These iterative steps typically require transfer steps between iterations as well to different machines.

In a traditional chocolate production process, the first step is grinding/refining to reduce particle size, and over grinding/refining will reduce particle size beyond a desirable threshold. Multiple grinding steps typically are used in series to each cause approximately five- to ten-times reduction in particle size, the steps separated to prevent over-grinding and using different grinders and grinding media, having many transfer steps between the different grinders. Then, mixing/homogenizing disperses the refined material uniformly, for example using a Frisse conche or horizontal drum grinders. Mixing takes a much longer period of time, and again often transfers through different iterative stages with many transfer steps.

Additionally, present grinders also process food products while heating them. For example, traditional grinders heat chocolate from one-hundred and twenty to one-hundred and eighty degrees Fahrenheit to help liquefy chocolates and drive off moisture and volatile organic acids, such as acetic acid) produced during the refining process, but doing so simultaneously drives off desirable flavor compounds and scorches the chocolate (above one-hundred and twenty degrees Fahrenheit). Thus, while the heating reduces cost of production, it effectively ruins the quality of the chocolate.

Further, many of these grinders/conches are open to the atmosphere, resulting in near complete diffusion of desirable flavors and compounds from the chocolate, as well as potential airborne contaminants. In other sealed-type grinders, anaerobic chambers are often used for operation and utilize temperatures that scorch the chocolate, overgrind the cacao, deal with evaporated humidity in manners that destroy the quality of the chocolate, and utilize a very high ratio of grinding material to load ingredients. Thus, what is needed is a versatile, modular system and method to process cacao products, while enabling easier maintenance, less transfer steps, increased particle selection ability, and superior output quality.

Additionally, environmental conditioning of the living and working space is a serious concern for both consumer and industrial applications, including food preparation, costing businesses and homeowners large sums every year to keep products, sensitive environments, workplaces, and homes at desired production conditions. And perhaps the greatest concern within environmental conditioning is humidity management, which requires a great deal of equipment and energy to keep under control.

Large-scale dehumidifiers typically require operation of large, cooled condensing coils, over which humid air is then passed to condense and collect the moisture from the air. However, such dehumidification units rely on huge amounts of electricity to operate, run the risk of runaway freezing on the coils that can damage the unit or ruin efficiency, and failing outright, requiring either costly repairs or costly redundancies to mitigate product losses. Such large-scale units, thus, are hardly a perfect solution, and simply cannot scale down into small-scale needs in any case.

Small-scale dehumidification, such as for dried food goods, typically relies on pulling a vacuum on the food products (e.g., fruits, vegetables, seeds, etc.) to forcibly pull moisture from the food products or baking at high temperatures. While these processes may be fast and effective at removing the moisture, the resulting dried products tend to be far inferior to the source materials due to the indiscriminant drying process driving or cooking of desirable aromatics and volatile flavor compounds, leaving the dried goods bland and far less desirable than the original, undried product. What is needed therefore are methods and systems to remove moisture from such products without adversely affecting the inherent quality.

The present novel technology addresses these needs.

BRIEF DESCRIPTION OF THE DRAWINGS

FIG. 1A depicts a first perspective view of a first embodiment of the present novel technology.

FIG. 1B depicts a top view of the first embodiment from FIG. 1A of the present novel technology.

FIG. 2A typically depicts a front view of the first embodiment of the present novel technology in a tilted configuration.

FIG. 2B typically depicts the side perspective view from FIG. 2B of the present novel technology in a tilted configuration.

Figure 1D:
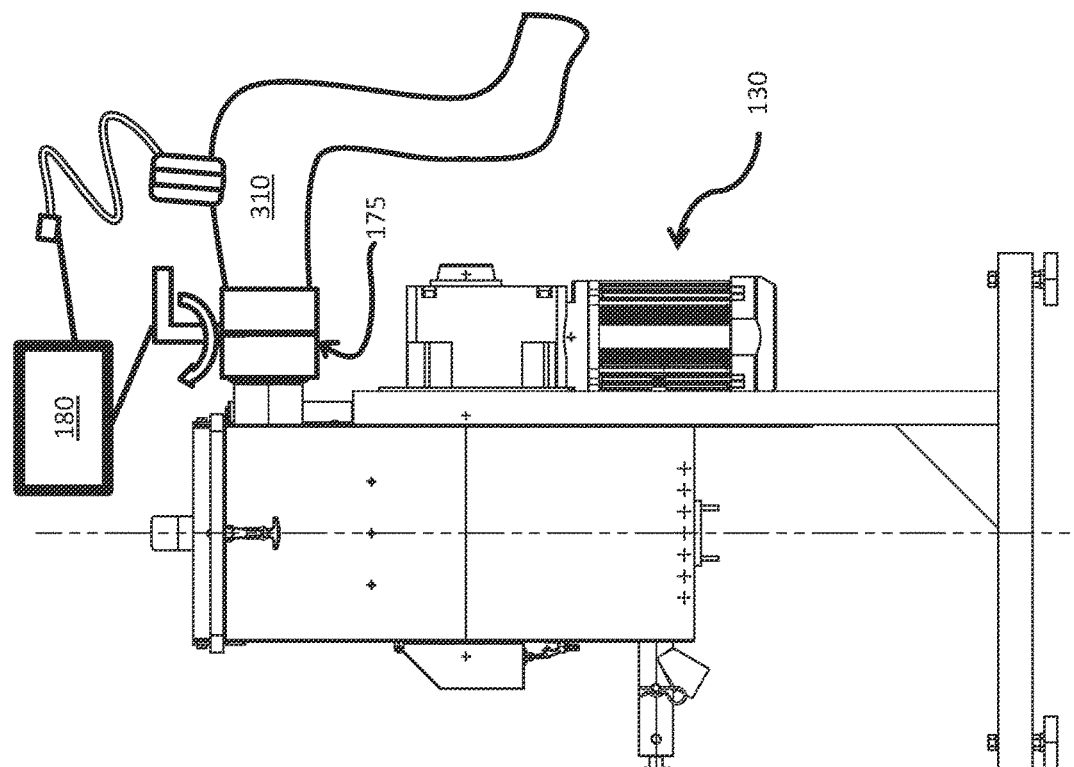
FIG. 1D depicts a first side view of a first embodiment from FIG. 1A of the present novel technology.
Figure 1C:
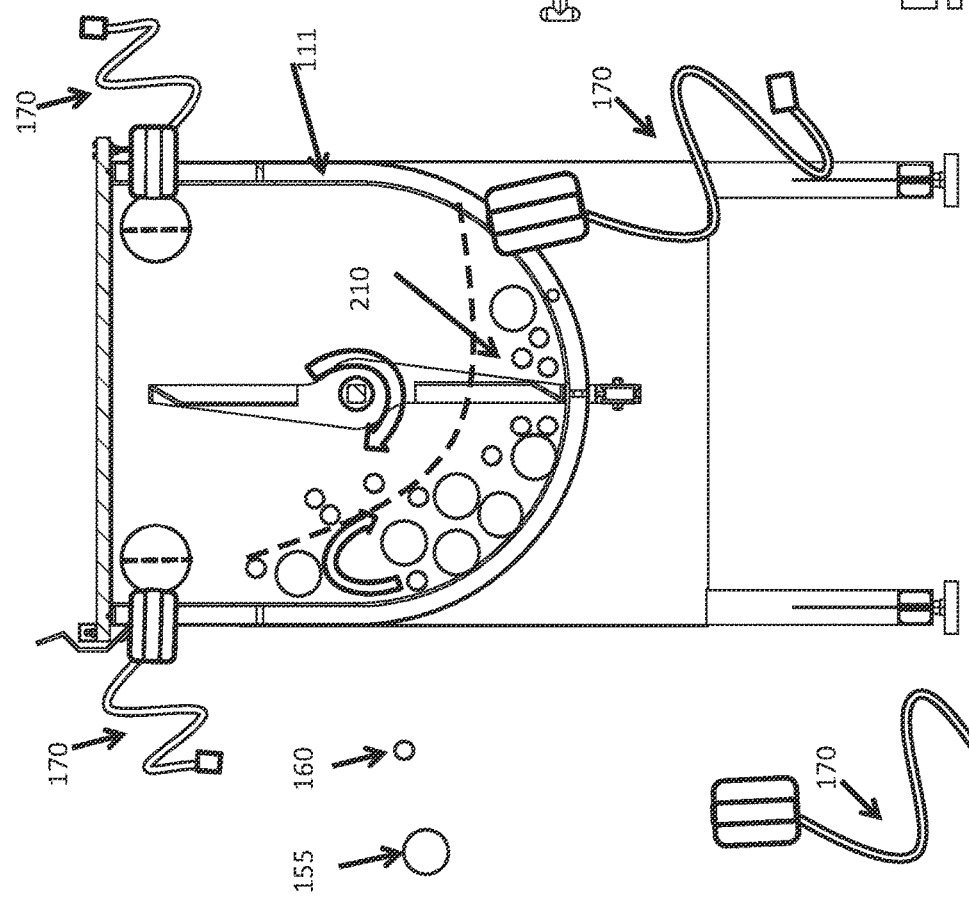
FIG. 1C depicts a front view of the first embodiment from FIG. 1A of the present novel technology.
Figure 1E:
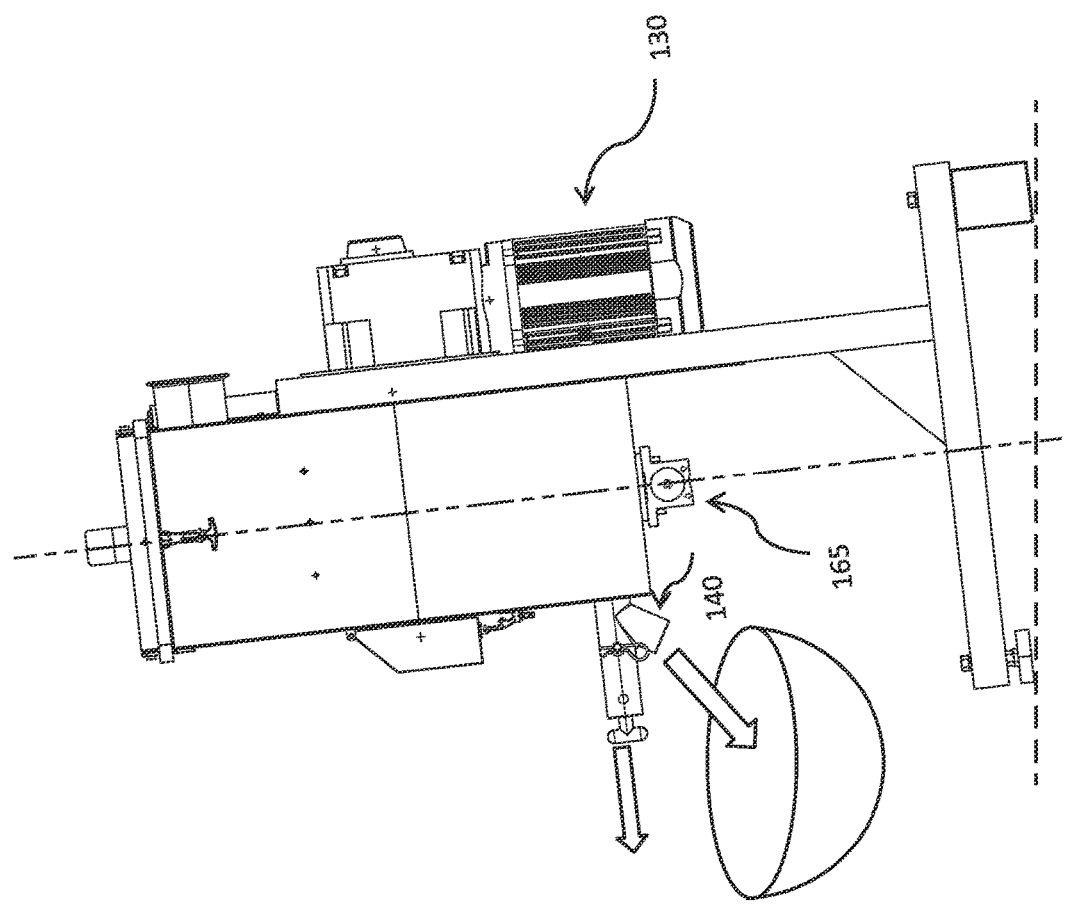
FIG. 1E depicts a second side view of a first embodiment from FIG. 1A of the present novel technology in a tilted, dispensing orientation.

Like reference numbers and designations in the various drawings indicate like elements. The details of one or more embodiments of the subject matter described in this specification are set forth in the accompanying drawings and the description below. Other features, aspects, and advantages of the subject matter will become apparent from the description, the drawings, and the claims.

DETAILED DESCRIPTION

Before the present methods, implementations, and systems are disclosed and described, it is to be understood that this invention is not limited to specific synthetic methods, specific components, implementation, or to particular compositions, and as such may, of course, vary. It is also to be understood that the terminology used herein is for the purpose of describing particular implementations only and is not intended to be limiting.

As used in the specification and the claims, the singular forms "a," "an" and "the" include plural referents unless the context clearly dictates otherwise. Ranges may be expressed in ways including from "about" one particular value, and/or to "about" another particular value. When such a range is expressed, another implementation may include from the one particular value and/or to the other particular value. Similarly, when values are expressed as approximations, for example by use of the antecedent "about," it will be understood that the particular value forms another implementation. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not. Similarly, "typical" or "typically" means that the subsequently described event or circumstance often though may not occur, and that the description includes instances where said event or circumstance occurs and instances where it does not.

FIGS. 1A-18 depict various features and example embodiments of the present novel technologies.

FIGS. 1A-10 typically depict the present novel grinder system 100 typically utilizes a rotating vessel member 110 and grinding media 123 to process food materials into particles of one or more desired sizes. The present novel grinder system 100 design also enables an operator to step through a number of grinding and preparation steps without ever having to transfer the food materials from the vessel 110.

While current designs require a great deal of grinding media, have high rates of media erosion (e.g., fifty percent loss of media per six months), require large spaces to operate, produces subpar ground food product outputs (e.g., poor tasting chocolate, overly processed chocolate, etc.), have large number of parts, requires transferring food materials between different machines for processing, and are nearly impossible to clean on a regular basis due to their complex designs, the present novel grinder system 100 simplifies the entire process while also improving the quality of ground food product outputs. Traditional ball milling techniques often have wear rate of approximately fifty percent of the ball's mass in six months, whereas the present novel technology experiences no measurable change in mass over two years. In essence, this novel grinding system 100 produces better results, while also being faster and easier to use, maintain, and clean.

FIGS. 11A-18 typically depict the present novel moisture removal system 1100 in various example embodiments. The moisture removal system 1000 typically allows precise and efficient moisture removal from materials without adversely affecting the inherent quality of those materials, which is vital for processing of sensitive materials and compounds.

FIGS. 1A-10 typically depict various embodiments and stages of use for grinding system 100. Grinder system 100 typically includes base member 105, vessel member 110, vessel lip 112, vessel spout 114, lid member 115, lid gasket 117, vessel volume 120, grinding media 123, shaft member 125, motor 130, mixing members 135, drain port 140, port member 145, tilt member 150, first media set 155, second media set 160, vibrating member 165, sensor(s) 170, valve(s) 175, and/or controller(s) 180.

FIGS. 1A-1E and 2A-2B typically depict grinder system 100. One or more base members 105 typically connect to vessel member 100, which in turn is connected to lid member 115. Base members 105 typically are one or more structures (e.g., legs, tripods, dampening members, and/or the like) that support vessel 110 and vessel's 110 contents 210 (typically contained in vessel volume 120) during storage and/or operation, typically being disposed between a ground surface and vessel 110. In some implementations, one or more base members 105 may elevate a side of grinder 100 to help dispense contents 210. In some other implementations, where grinder 100 may be mounted to another surface (e.g., wall, cable, and/or the like), base member 105 may be omitted and/or substituted for an alternative support member 105 (e.g., a wall bracket, cable, rod, and/or the like). Base members 105 may be permanently affixed to vessel 110 (e.g., via weldment, adhesives, and/or the like) and/or semipermanently affixed to vessel 110 (e.g., via removable fasteners, groove plates, and/or the like).

Vessel 110 may be made using one or more plastics (e.g., polyethylene terephthalate (PET), polycarbonate (PC), high density polyethylene (HDPE), low density polyethylene (LDPE), polypropylene (PP), and/or the like), metals (e.g., stainless steel, copper, aluminum, and/or the like), combinations, and/or the like. One example bowl 110 diameter may be twenty-six inches in diameter and thirty-three inches in width, but bowl 110 size and/or shape may tailored as desired.

The wall of vessel 110 may typically be smooth, but in other implementations may be textured, grooved, and/or otherwise created to preferentially enable more efficient flow of food products 210, grinding media 123, and/or the like. In some implementations, the impact surfaces of vessel 110 may be constructed using a thicker, more impact-resistant material (e.g., seven-gauge stainless steel, etc.) and the nonimpact surfaces may be alternatively constructed (e.g., using twelve-gauge stainless steel, etc.).

Vessel 110 may, for example, be approximately twenty-four inches in diameter and forty inches in width. In some implementations, these dimensions may typically be the optimal size that may be manually serviced by an average individual. In some implementations, vessel 110 may be surrounded partially and/or fully by one or more vessel heatsinks 111 (e.g., cooling array, liquid jacket, and/or the like), which typically may be in thermal communication with vessel 110 (e.g., via thermal compound, fasteners, molded/formed into wall of vessel 110, and/or the like). In some implementations, vessel 110 itself may act as heatsink 111. For example, vessel 110 walls may be made of stainless steel and efficiently transfer heat.

Heatsink 111 may, in some implementations, have one or more fluidic exchange ports 215 (also referred to as heatsink ports, depicted in FIG. 2) to send and receive thermally-laden material (e.g., hot/cold fluids). For example, water in a liquid jacket heatsink 111 may be pumped to a heat exchanger 220 (depicted in FIG. 2), chilled and/or warmed to a preset temperature, and then returned to heatsink 111, maintaining vessel 110 at one or more preset temperatures and/or profiles.

Some further implementations allow vessel 110 configurations such that vessel 110 may be scaled in size, typically in the width and length dimensions and keeping a substantially similar depth. For example, vessel 110 may be twenty-four inches in diameter (e.g., as defined by the inside depth from lip 112 to drain member 140) and eighty, one-hundred and twenty, and/or the like inches in width. Still further examples may include creating a plurality-shaft 125 vessel 110, wherein vessel 110 may be, for example, forty-eight inches from front to back, twenty-four inches in vessel volume 120 depth, and forty inches in width, with two or more motor shafts 125 to mix one or more vessel volumes 120. In some implementations, vessel 110 may be constructed such that for each set length (e.g., six inches, ten inches, twelve inches, etc.) of vessel 110 length, a corresponding amount of content 210 processing capacity may be correlated (e.g., twenty-five pounds, fifty-five pounds, one hundred pounds, etc.). In further implementations, mixing paddle(s) 135 may similarly correlate to a processing capacity (e.g., five pounds, ten pounds, fifty pounds, etc.).

While traditional grinding mills are statically sized based on the grinding granularity and content 210 load, requiring significant effort for optimization, the present novel system 100 may actually scale (typically in a linear fashion) to different batch sizes by simply scaling vessel 110 longitudinally. For example, while scaling a traditional ball mill from a fifty-pound food content 210 load to a two-hundred pound content 210 load is simply not possible without dramatically redesigning the system 100 with great time and expense, the present novel technology allows vessel 110 to be extended longitudinally without any significant redesign. Thus, for example, a fifty-pound load vessel 210 be sized as twenty-four inches in diameter and ten inches width, a one-hundred pound load vessel 210 may be sized at twenty-four inches in diameter and twenty inches in width, and a one-thousand pound load vessel 210 may be sized at twenty-four inches in diameter and two-hundred inches width, all while using the same grinding media 123. A smaller, fifty pound system may then, for example, be used to test various food content 210 batches and flavors before then scaling seamlessly to a large scale batch for production. Thus, the present novel system 100 drastically increases scalability and efficiency over traditional systems.

Vessel 110 typically may have vessel lip 112 about the top surface of vessel 110, and in some embodiments may have one or more vessel spouts 114 formed therein and/or connected thereon. Spout 114 typically may allow a grinding system 100 operator, in some implementations, to dump the contents 210 of vessel 110 and volume 120. In still further implementations, an operator may use tilt member 150 to assist the tipping, dumping, cleaning, and/or other process with system 100.

Lip 112 may, in some implementations, also have one or more lid gaskets 117 formed therein and/or connected thereon, which typically may act to seal lid member 115 to vessel 110 and vessel lip 112, typically in a substantially airtight manner. Lid member 115 typically is connected then to vessel member 110, typically by one or more pivotable connection members (e.g., hinges, pins, and/or the like) that allow lid 115 to pivot open and allow access to volume 120.

Volume 120 typically may be the space defined by the inside of vessel 110, and in some implementations lid 115. Volume 120 typically includes grinding media 123 (e.g., abrasive structures, balls, and/or the like), shaft member 125, mixing members 135, and/or drain port 140. In some implementations, a full and/or partial vacuum may be created in volume 120, typically with the aid of lid 115 and gasket 117, which in turn may place the contents 210 of volume 120 under vacuum as well.

Grinding media 123 typically may be stainless steel balls, but may in some implementations be of alternative materials and/or configurations where a similar grinding result is accomplished. Typically, grinding media 123 reduces vessel volume 120 contents 210 (e.g., cacao nibs, cacao butter, cacao liquor, etc.) down to ten to thirty microns, more typically fifteen to twenty-five microns, and more typically twenty to twenty-five microns in size. Grinding media 123 typically may be two differently sized stainless steel balls sets, the first grinding media set 155 (also referred to as larger media set) typically being three-quarter to one and a half inches diameter, more typically seven-eighth to one and a quarter inches diameter, and more typically one inch diameter; while the second grinding media set 160 (also referred to as smaller media set) typically may be one and a half to three inches diameter, more typically two to two and three-quarter inches diameter, and more typically two and a half inches diameter. Further, the ratio of smaller media set 160 to larger media set 155 for grinding media 123 typically may be fifty:fifty, seventy:thirty, seventy-five:twenty-five, eighty:twenty, ninety:ten, or ninety five:five, wherein seventy-five:twenty-five typically may be preferable. Such combination of grinding media 123 is unconventional for cacao refining, as traditional systems rely on only a single grinding media 123 and multiple stages, as traditional mills using multiple media 123 sizes at once fails to properly process the food contents 210 (typically by either grossly over- or undergrinding, and in some cases simply failing to grind at all as the media 123 interferes with itself). The present novel system's 123 design and grinding media 123 thus presents a previously unknown, and nonobvious result over current systems and methods, and allows system 100 to actually target and asymptote to a particle size without risking over- or undergrinding.

The present, novel grinding media 123 configurations vastly differ from current methodologies as use ball sizes from approximately one-quarter to five-eighths inches in diameter, more typically three-eighths to one-half inches in diameter, which simply cannot adequately process cacao and/or like food products without overgrinding softer components, undergrinding harder components, imparting large amounts of thermal energy into the food products and grinding system (often ruining and scorching food products in the process), and wearing traditional grinding media at a rate of approximately fifty percent reduction of the grinding media every six months (the metal then entering the food product and potentially the consumer). Comparatively, the present novel technology mixes and grinds food products (e.g., cacao) to the desired particle size without overgrinding, grinds over a longer period of time without imparting excess heat to the contents 210 and/or system 100, and, over a two-year period, has had zero measurable wear in the grinding media 123. Such results were wholly unexpected and vastly improve food processing over prior art conches and mills, while also making the process substantially simpler and more efficient. The use of the novel grinding media 123 also extends the refining time and accordingly correlates to the longer, mixing process time, creating a single-step process unknown in prior art techniques and methods.

Shaft member 125 typically may connect to motor 130 and extend into volume 120. Shaft member 125 typically may be sealed at vessel 110 to prevent contents 210 in volume 120 (e.g., liquid chocolate) from escaping, assist a vacuum seal, and/or contaminating other system 100 components and/or the work space. During operation, liquid line typically may be maintained at or below such a shaft seal 205, but in other implementations liquid line may extend above 205.

One or more mixing members 135 typically may be connected to shaft 125, which typically may act to agitate and mix contents 210 in volume 120. Mixing members 135 may, for example, be paddles, sigma blades, flexible blades, ribbons, and/or the like. Mixing members 135 typically may be equally spaced along shaft 125, often in a spiral pattern along shaft 125, but may also be altered in size, shape, quantity, and/or the like to more efficiently mix contents 210 and/or grinding media 123.

One nonlimiting exemplary mixing member 135 may be paddle 135, which typically may provide three-dimensional agitation of content 210 from a one-dimensional motion. Such paddle 135 typically may include bottom and/or side lifters of approximately two inches in height that may typically trail at an angle of approximately thirty degrees. This configuration typically may cause the grinding media 123 to increase in density by waterfalling through a narrower orifice (e.g., approximately six inches in width) within a central path while the chocolate cavitates around the side wipers, causing mixing and aeration. Typically, contents 210 may flow centrally along the paddle 135 towards the end opposite the waterfall flow and be drawn back toward the waterfall as it is drawn in on the sides as a result of the cavitation. This typically may result in circular mixing and more even particle size reduction. In some other implementations, with a multi-paddle 135 design the paddles 135 may all be in line, or may be alternating.

Motor 130 typically may be housed outside of volume 120, typically connected to shaft 125 through one or more sealing apertures in vessel 110. When energized via power source 133, motor 130 typically may urge shaft 125 and mixing members 135 to rotate in vessel volume 120, typically urging mixing media 123 and/or contents 210, processing the contents 210 to a desired size and/or texture. Typically, motor may operate at approximately ten to fifty revolutions per minute (RPM), more typically fifteen to forty RPM, and more typically at twenty to twenty-five RPM, while traditional processing methods typically operate at eighty or more RPM and significantly increases viscous heating of ground food products. In some implementations, a cascading paddle 135 (e.g., typically having horizontal and vertical compression) may allow grinding media 123 to have a more reliable drop height during mixing. Such grinding may typically be accomplished between ten to twenty-five RPM, more specifically fifteen to twenty RPM, more specifically at approximately 17.5 RPM. Power source 133 typically may be an electrical source (e.g., wall outlet), but in other implementations may be powered by internal combustion engines, compressed gases, and/or any other power source adapted to operate grinder 100.

Drain member 140 typically may be one or more fluid-tight apertures, which typically may be actuated between open and closed positions, formed in lower portion of vessel 110. Drain members 140, when in a closed position, seal vessel volume 120 from external environment 103. When using drain member 140 in an open position, drain 140 typically may be connected to another pneumatic line 310, which may allow system 100 operator to pull a vacuum on volume 120, to draw contents 210 from volume 120, to drain cleaning fluid from volume 120, and/or the like. In some implementations, drain member 140 may be a drain port 140, which may be formed through vessel 110 and accept pneumatic lines 310. Alternatively, in some implementations, vessel 110 and lid 115 may be closed and positively pressurized with respect to environment 103 resulting in contents 210 being discharged through the drain member 140.

Similar to drain member 140, port member 145 typically may be one or more fluid-tight apertures, which typically may be actuated between open and closed positions, typically formed in upper portion of vessel 110 and/or lid 115. Pneumatic port 145 typically may be used to pull a vacuum on contents 210 in volume 120, allow air exchange from volume during operation (e.g., as with recirculating absorption system 300 depicted in FIG. 3 or other drying/absorption systems described in this disclosure), dry vessel 110 and/or volume 120 during cleaning or preparation stages of production, remove contents 210 from volume 120 when vessel 110 is tilted, and/or the like.

Tilt member 150 typically may be one or more rigid bars, wheels, levers, and/or like structures connected to vessel 110 (e.g., via fasteners, weldments, threads, and/or the like) that urge vessel 110 about one or more pivots, typically pivoting the substantially vertical face of vessel 110 forward (as depicted in FIGS. 1 and 2) and toward an operator. In some implementations, tilt member 150 may be modified and/or substituted for a powered pivoting system, which typically may use one or more powered pressure members (e.g., jacks, rotary actuators, electronically controlled cams, and/or the like) to pivot vessel 110. Tilt member 150 typically may allow vessel 110 to be tilted laterally and/or vibrated (in some implementations utilizing vibrating member 165 (to allow contents 210 to drain from drain 140 as well.

Figure 3:
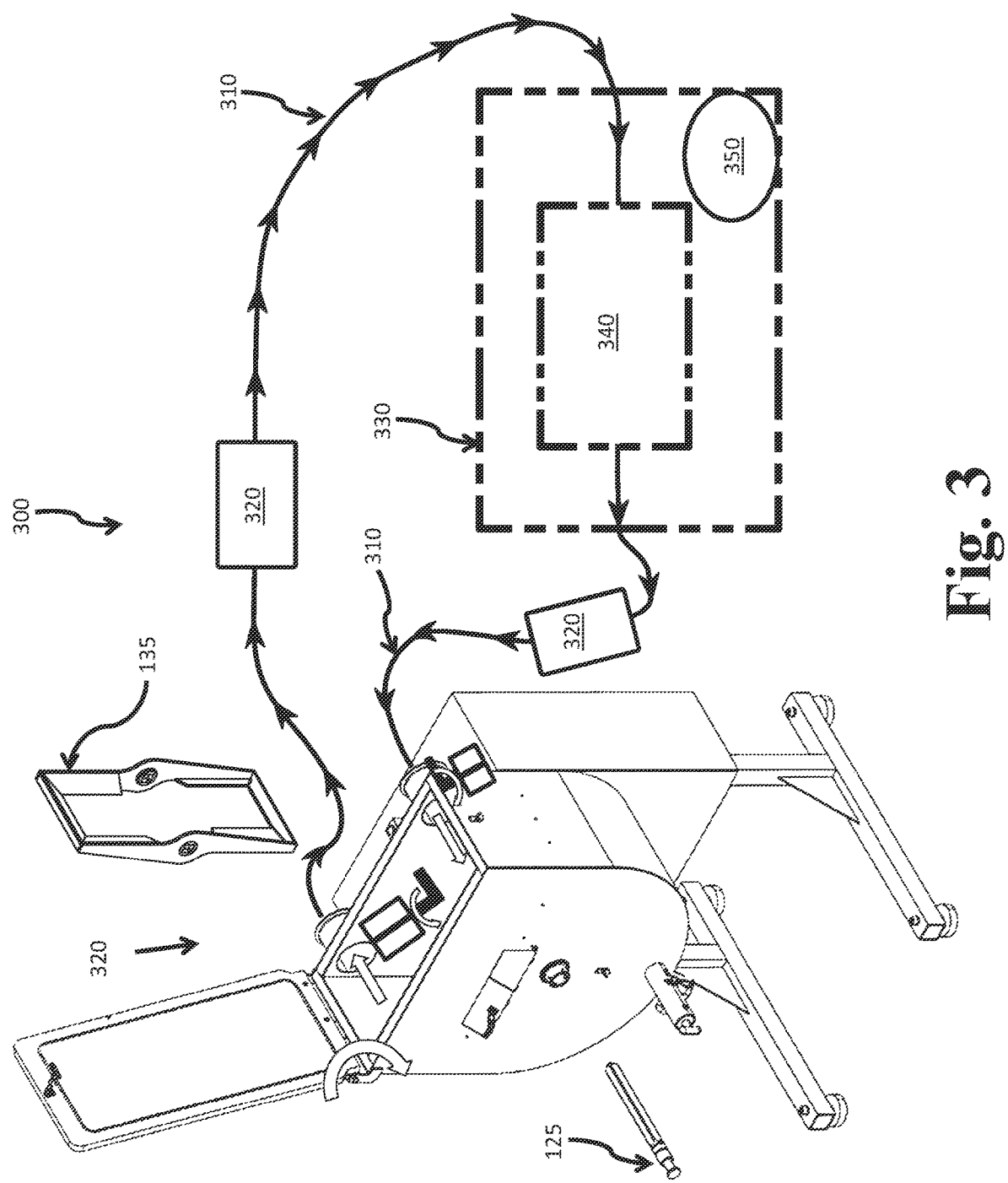
FIG. 3 depicts a third perspective view of the first embodiment of the present novel technology with recirculating absorption system.

Grinding system 100 typically may operate with contents 210 substantially isolated from environment 103 to preserve sanitation, volatile flavor compounds, and the like. However, as contents 210 are processed, moisture typically may also be released, hindering the processing efficiency. One implementation to resolve the excess moisture problem, while not negatively impacting the quality of the processed contents 210, is depicted in FIG. 3 with a recirculating absorption system 300. Further, chemical specific absorbent media 340 may also be used to absorb water and/or acetic acid, while still preserving complex flavors.

In one embodiment of the present technology, a ten-inch wide, twenty-four inch diameter vessel 110 may be charged with one hundred and fifty pounds of 440C stainless steel grinding media 123 at a seventy-five percent small to twenty-five percent large ratio. Approximately thirty-five pounds of roasted and winnowed nibs 210 with a particle size of average dimensions of approximately one-quarter cubic inches with a temperature between ninety and two-hundred degrees Fahrenheit may be added to vessel 110.

Vessel 110 typically may then be sealed from environment 103, the agitator 130 is energized to approximately seventeen RPM, and air is circulated in a closed isolated loop from the vessel volume 120 with a high moisture content, dried by passing through drying media 340, and returned back to the vessel volume 120 at approximately forty cubic feet per minute (CFM) with a dew point of approximately negative thirty-five to negative forty degrees Celsius.

Cacao nibs 210 may then be ground into a course cacao liquor for a period of approximately two hours under these conditions with a water jacket 111 temperature set at approximately ninety-one degrees Fahrenheit and a content 210 temperature of approximately ninety-three degrees Fahrenheit. After an initial drying period of approximately one and a half to two and a half hours, the drying cycle typically may be shut off and the vessel volume 120 is isolated with typically airtight valves in pneumatic lines 310, typically on the inlet and outlet to the drying unit 300.

Grinder 100 and vessel 110 continues to grind under such isolated conditions for an approximate period of an additional four hours. The air valves in lines 310 typically may then be opened and the ground cacao liquor 210 may be dried for an additional ten to thirty minutes under the same conditions to remove moisture released during the grinding process. Sugar and cacao butter typically may then be added and grinding may continue for an additional ten to fourteen hours.

The contents 210 may then be heated to one hundred to one hundred and ten degrees Fahrenheit and dried for an additional zero to thirty minutes preceding discharge to adjust viscosity by removing additional water. Care typically is taken to preserve volatile flavor compounds. For example, if too much moisture is removed, the vapor pressure of the flavor compounds will increase, resulting in loss of flavor. This process enables one-pot refining, drying, and mixing in one sealed vessel 110 within a twenty-four hour process window.

The vessel 110 may then be washed with water and soaps using conventional methods, rinsed, and dried using the airflow from the drying unit 300 to rapidly reset the drum 110 for a subsequent batch. This process may take less than one hour to clean and reset a machine 100 for the next batch. The large grinding media 123 typically enable sufficient cleaning without trapping food particles 210 between cleaning cycles. Water may be discharged during agitation to remove any trapped and/or unground food materials 210. In some implementations, an additional alcohol mist may be used if paddle 135 is cleaned in place in order to better sanitize the system 100 components and/or environment 103. This process isolates the batch-to-batch flavors of contents 210 (typically chocolate 210) enabling several unique products to be produced on the same equipment.

Further, the moisture of cacao butter may typically be substantially consistent and nominally at about one-quarter to three-quarter percent. The moisture content, by weight, of sugar may also typically be in a similar range. The majority of the moisture removed during chocolate manufacturing originates from the nibs, which typically may enter the process at approximately four to six percent moisture content, of which about sixty to eighty percent must typically be removed from the product prior to packaging. Traditional grinding techniques, such as in roller or disc refiners, utilize the high moisture content to enable refiners to "grab" ahold of the chocolate 210 and pull it through the process equipment. Unfortunately, the moisture reacts with the flavor compounds resulting in degradation during this process.

The method of the present novel technology removes the moisture as it is released from the cells during the refining process before it has an opportunity to significantly and negatively affect the flavor of the contents 210, thereby preventing the thermally activated hydrolysis of esters and other delicate flavor compounds.

In further implementations, recirculating absorption system 300 typically may connect to system 100 via one or more ports (e.g., port members 145). Pneumatic lines 310 (typically known in the art) then connect ports 145 to absorption vessel 330, which typically may be constructed of composites, plastics, stainless steel, and or the like, and typically may be pneumatically sealed and typically contains absorbent media 340. Some implementations may include one or more check valves 320 in pneumatic lines to direct airflow. Moisture-laden air typically may be drawn from vessel volume 120, passing through pneumatic lines 310, entering absorption vessel 330, passing through absorbent media 340, absorbent media 340 absorbing the moisture from the air, and then returning through pneumatic lines 310 back into vessel volume 120. In some implementations, vacuum unit 350 maybe used to pull air through pneumatic lines 310 and/or be used as blower unit 310 to ingress/egress air through pneumatic lines 310, absorption vessel 330, and absorbent media 340.

Absorbent media 340 typically may absorb moisture via chemical (e.g., quick lime and components that absorb via chemical reaction) and/or physical absorption methods (e.g., silica gels, molecular sieves, and/or the like). For example, the present novel system 100 may use molecular sieves sized from one to twenty-five angstroms, more typically two to ten angstroms, and more typically three to five angstroms, and more specifically three to four angstroms. Water only absorption typically may be preferred using three to four angstrom media 340, while molecular acids, such as acetic acid typically may be absorbed in media 340 with pore sizes of five angstrom and above. In some implementations, it typically may be preferred to use ion exchanged potassium sodium aluminumosilicate with a high potassium substitution content resulting in a mixed $3a$, $4a$ media.

Molecular sieves as absorbent media 340 typically may absorb the excess water, but will leave volatile acid compounds that make up the complex flavors of contents 210 (e.g., blueberry, raspberry, and/or the like notes of high-quality chocolate). Several such exemplary embodiments of moisture removal systems 1100 are further discussed in FIGS. 11A-17 below in this application. Molecular sieves typically may also be regenerated between four hundred and five hundred degrees Fahrenheit under a flow of air exchanged with the environment 103 for a period of one to two hours to remove absorbed acids and water, and to restore initial conditions to prevent batch.

In some implementations, absorption system 300 also may include absorption media 340 regeneration capabilities. For example, one or more desiccant regeneration methods (e.g., heating absorbent media 340 to vaporize absorbed water, diffusing water via dehumidifier, etc.) may be used to recharge media 340. In another implementation, absorption system 300 may have more than one bay of media 340 in absorption vessel 330 (and/or one or more vessels 330, each having one or more media 340 bays), which may be actuated between. For example, system 300 may have a plurality of bays of absorbent media 340, each bay being selectable via open/close valves, blast gates, electronically actuated gates, and/or the like, and system 300 allow air to flow through the first bay until the first bay's media 340 is saturated. At this point, system 300 may close the first bay and open the second bay, while also activating a recharging system in the first bay to desaturate the first bay's media 340. This process may then continue through the various bays, and the system 300 may be scaled (e.g., having two, five, ten, etc. bays/absorption vessels 330) to maintain saturation and/or recharge rates while keeping vessel volume 120 air at a sufficiently low moisture content.

In other implementations, absorption system 300 and/or media 340 may be manually recharged. For example, as above one or more media 340 bays may be available, and/or one or more media 340 trays may be removable/replaceable. Thus, as one tray is saturated, an operator may halt and/or airflow through vessel(s) 330, remove media 340 tray, place media 340 tray in an oven to recharge media 340, and then replace recharged media 340 tray into system 300. Further, in some implementations, one or more air filtration elements may be used to prevent dust and/or debris from exiting absorption vessel 330 and returning to vessel volume 120 and mixing with food contents 210. For example, such an air filter element may be preferably less than 10 micrometers, more preferably less than 5 micrometers, and still more preferably less than 1 micrometer for particle size filtration.

Still further implementations may include one or more sensors 170 (e.g., temperature sensors, airflow sensors, humidity sensors, and/or the like) to measure airflow, moisture content, pressure, and/or the like of air flowing through lines 310, through ports 145, through vessel(s) 330, and/or the like. Sensor data may then be used to trigger alarms (e.g., to change media 340 tray, switch media 340 bay actuators, and/or the like), automatically open/close ports 145 and/or valves 175, actuate to new media 340, initiate/stop recharging of media 340, and/or the like. Airflow rate sensors 170 typically may also be used to determine the flow rate of the cooling air. In one embodiment, a moisture meter 170 may be placed in the incoming and outgoing process air streams (e.g., on lines 310) and a sensor may be used to measure the flow rate of the air. From this data, the approximate mass of moisture may be calculated and the specific amount of moisture may be removed from vessel 110.

Some implementations may utilize one or more controller 180 to control grinder system 100 components. For example, controller 180 may receive and analyze sensor 170 readings, actuate valves 175, turn on recirculation units 350, increase/decrease rotation speed by controlling motor 130, and/or the like. Controller 180 may typically operate using predefined profiles and routines, several of which are explained in various examples in this disclosure, or controller 180 may operate using machine learning and/or adaptive logic routines to optimize and maintain system 100 operation.

Processes for measuring moisture in contents 210, specifically chocolate, are notoriously difficult. The chocolate tends to polymerize during gravitational evaporatory experiments, resulting in inconsistent results. Infrared moisture sensors are sensitive to particle size, fat content, and temperature, which limit their application during the refining process, where the viscosity is constantly changing. The initial moisture content of the nibs; however, may be accurately measured utilizing gravimetric moisture meters, where the beans are weighed, dried, and weighed again to determine the relative moisture content.

In some further examples, airflow rate sensors 170 may also be used to determine the flow rate of the cooling air. In one embodiment, a moisture meter is placed may be placed on the incoming and outgoing process air streams (e.g., in lines 310) and a sensor 170 may be used to measure the flow rate of the air. The mass of moisture typically may then be calculated by multiplying the airflow rate by the difference of the moisture content between the inflow and outflow. If the initial moisture content of the ingredients is known, then a specific mass of moisture may be determined and removed by the system. Thus, a nonlimiting overview of such novel method would be 1) Measure the initial mass and identify the starting moisture content of ingredients 210; 2) place ingredients in grinder 100; 3) close lid 115 and begin flow of dry air; 4) measure airflow rate, and incoming and outgoing air streams; 5) continue drying process until desired mass of moisture is removed; and 6) close grinder port(s) 145 and isolate food 210 from drying media 340 to maintain desired moisture level. A sample calculation is provided below:

Atmospheric pressure air typically may be at a dew point of negative forty degrees Celsius at a temperature of thirty-seven degrees Celsius, which may be typical of dry air returning from the dryer unit 330 (and/or 1100, 1200, 1300, 1400) to grinder 100, which typically corresponds to approximately 0.0896 grams of water per cubic meter, a dew point of ten degrees Celsius and a temperature of thirty-seven degrees Celsius. This, typically, may result during active drying of a semi-dry food product 210 of approximately 8.57 grams of water per cubic meter. A typical flow rate of a twenty-four-inch diameter by ten-inch wide grinder vessel 110 may thus be between five and fifty cubic feet per minute, or 0.142 to 1.42 cubic meters per minute. Therefore, at 1.42 cubic meters per minute, a system 100 (or 300) with a dry air dew point of negative 40 degrees Celsius and a returning dew point of ten degrees Celsius may remove approximately 12.05 grams of water per minute. If twenty kilograms of cacao nibs with initial moisture content by weight of six percent are to be dried to a final moisture content of one and a half percent, then nine hundred grams of water must be removed, which would take approximately seventy-five minutes using the novel system 100 (and/or 300, 1100, 1200, 1300, 1400, etc.).

In such implementation, initial dew points of the dry process air entering the vessel 110 typically may be between negative sixty and fifty degrees Celsius, more specifically negative fifty and twenty degrees Celsius, and more specifically negative forty-five and negative twenty degrees Celsius. Moist air returning from the vessel 110 to the air dryer 330 typically may have a dew point between negative twenty to fifty degrees Celsius, more preferably negative ten to twenty-five degrees Celsius, and more preferably negative five to fifteen degrees Celsius. Further, the mass of chocolate 210 processed by chocolate grinder 110 typically may be between thirty-five and sixty-five pounds for a twenty-four-inch diameter vessel 110 for every ten inches of length, typically with a stainless steel grinding media 123 charge of one hundred and fifty pounds.

The drying process of the present novel technology may be applied continuously to the process food, or it may be applied intermittently to allow moisture levels of the food to equilibrate under an isolated environment between drying cycles. Isolation periods of the present technology for semi-dry goods, such cacao liquor or cacao nibs, typically may be one to sixty minutes, more preferably two to twenty minutes, and more preferably four to fifteen minutes. The present novel technology uniquely enables moisture of chocolate and other food materials 210 to be determined during isolation periods, during which equilibrium atmospheric moisture levels may be determined and used to calculate water activity levels, which may correlate directly to moisture content of the food contents 210. For contents 210 such as chocolate, a moisture level of one to one and a half percent by weight is desirable, which corresponds to a water activity level of approximately 0.18 to 0.55, or eighteen to fifty-five percent relative humidity of the isolated atmosphere in equilibrium.

In another implementation of the present novel technology, a discontinuous drying process may be used to maintain a specific water activity level within a desired product 210 during grinding where water is continuously released due to the disruption of the cellular structures. This typically may enable food processors to deliberately limit the degradation of desirable flavor compounds during particle size reduction, which degrade during conventional grinding techniques. Under the present technology, a food material 210 with a reasonably high moisture content may be added to the vessel 110 and dried rapidly under an initial phase to reach a desired water activity level. During this phase, where the rate of moisture removal is limited by moisture release at the food/air interface, the ratio of drying time to isolated equilibrium resting time may be between one:one and and one-hundred and fifty:one, more preferably between two:one and one-hundred and twenty to one, and more preferably still three:one and fifty:one, until a desired initial water activity level is obtained. At this time, a second drying phase with an intermittent drying cycle using a drying time to resting time ratio of one-tenth:one and five:one, more preferably one-half:one and two:one, and more preferably six-tenths:one and one:one, may be used during particle size reduction to maintain a desired maximum water activity level to limit food chemistry that may degrade flavors of contents 210.

In another nonlimiting example, twenty kilograms of cacao nibs 210 may be added to a grinder-dryer 300 following roasting and dried at atmospheric pressure under a first phase for a period of ninety to one-hundred and fifty minutes, more preferably approximately one-hundred and twenty minutes, under a flow of dry air at a flow rate of thirty to forty CFM, more preferably approximately forty CFM, with an incoming air dew point of approximately negative twenty to negative fifty degrees Celsius, or approximately negative forty degrees Celsius at a temperature of thirty-two to thirty-eight degrees Celsius, more preferably approximately thirty-five degrees Celsius. Then the grinding chamber ports 145 may be closed resulting in the atmospheric isolation of the grinder atmosphere 120 and its contents 210. The air in volume 120 typically may then reach equilibrium humidity with the grinder contents 210 for a period of one to twenty minutes, more preferably two to ten minutes, more preferably three to six minutes, and still more preferably approximately five minutes. If the relative humidity level exceeds eighty-five percent, more preferably seventy percent, more preferably sixty percent, and still more preferably fifty-five percent, chamber ports 145 may be opened and dried for a period of one to twenty minutes, more specifically two to fifteen minutes, more specifically five to ten minutes, and then ports 145 may be closed again to allow the contents 210 to equilibrate and establish an equilibrium humidity. This process may continue for the duration of the refining and mixing resulting until a desired average particle size is reached, such as ten to one hundred microns, more preferably fifteen to eighty microns, more preferably eighteen to twenty-five microns, resulting in flavorful ground cacao liquor 210 with a desired water activity level, viscosity, and preserved flavor profile.

If chocolate content 210 is desired, the process may proceed as described above for the first phase, and the second phase may proceed for a predetermined period of time, for such as five to seven hours, or more preferably approximately six hours, or until the average particle size is twenty-five to two-hundred and fifty microns, more preferably fifty to one-hundred and fifty microns, and more preferably approximately one hundred microns. The grinder vessel 110 may then be opened, or an isolated grinder compartment may then be activated, to additional ingredients 210, such as sugar and cacao butter, and refining and water activity limits may then be maintained during the refining process until a desired average particle size, such as fifteen to twenty-five microns, or approximately twenty-two microns, is reached. The chocolate contents 210 may be maintained between eighty-eight and one-hundred and five degree Fahrenheit, more specifically between ninety-one and ninety-eight degrees Fahrenheit, and more specifically approximately ninety-four degrees Fahrenheit during the first and second phase of the drying process following an initial cool down period if the ingredients 210 are added above the operating temperature. The vessel 110 walls typically may be maintained between eighty-seven ninety-five degrees Fahrenheit, more specifically ninety and ninety-five degrees Fahrenheit, and more specifically between ninety-one and ninety-three degrees Fahrenheit, to remove heat resulting from mechanical energy during refining.

The contents 210 may then be discharged from a spout (e.g., drain member 140, lip 112, etc.) and the system 100, 300 may be reset for another batch of contents 210. It may be preferred to heat the chocolate 210 to a temperature of one hundred to one-hundred and fifteen degrees Fahrenheit immediately prior to discharging contents from vessel 110 to decrease the viscosity of the chocolate 210 and increase the batch yield. Contents 210 may also be heated briefly for a period of ten minutes to two hours during the grinding process to the same range to thermal activate the emulsification process and to decrease the viscosity of the final product contents 210. Thus, this method typically enables chocolate contents 210 to be produced to a desired moisture level in a one batch refining and mixing system 10 to a desired and highly tailored specification.

In some further implementations, the process of measuring an adjusting water activity may occur continuously during the grinding processing without removing content samples. Such an automated process may, as noted above, utilize one or more moisture and humidity sensors 170, as well as airflow sensors 170, to determine the water activity of contents 210, actuating ports 145 to selectively dry air and contents 210 using drying media 340 until a specified water activity level and/or threshold is achieved.

In another embodiment of the present invention, the present integrated mill and drying system 100, 300 may be used in a novel method of making raw preserved food contents, such as jam. During such a method, moisture is tested to approximately twenty-seven to thirty-three percent in the vacuumed contents 210. The process is similar to producing chocolate described above, and a fruit juice content 210 may be added to vessel 110, and vessel 110 may contain a mixing member 135 with or without additional grinding media 123. The contents 123 may be heated to at least one-hundred and thirty-five degrees Fahrenheit to dissolve the sugar and sanitize the fruit contents 210; then dried until a water activity level of 0.75 to 0.85 is reached; and then discharged from vessel 110. Thus, such a method may not trend toward a specific particle size or reduction using media 123 but rather primarily mix contents 210 toward a desired consistency.

The food contents 210 may be dried at lower temperatures in the range of forty-one to eighty degrees Fahrenheit by rapidly lowering the content 210 temperature to between eighty and ninety degrees Fahrenheit, typically at a rate of at least one degree per minute, drying contents 210 for an initial phase with a period of less than three hours, then lowered to a temperature of thirty-two to forty-one degrees Fahrenheit and dried according to the second phase of the process until desired contents 210 consistency and specification is achieved.

Typically, volatile flavors in jam typically degrades at temperatures above one-hundred and fifty degrees Fahrenheit. However, in the industry, jams typically are produced at two-hundred and twenty degrees Fahrenheit to achieve the proper water activity level, which substantially, if not completely, degrades the jam product of volatile flavor compounds. The present novel technology thus provides a novel method for maintaining flavor compounds of fruit and/or vegetable products that meets sanitation requirements while maintaining these vital flavor compounds.

In some applications, fruit preservatives may be produced under raw conditions of less than eighty degrees Fahrenheit by placing fruit juice contents 210 in the vessel 110 and directly drying the contents 210 with or without the addition of sugar to a sufficient water activity level. Raw products 210 may be dried to lower relative water activity levels, such as 0.5 to 0.75, to compensate for the lack of a thermal sanitization step (e.g., Pasteurization, etc.) in the process. While some bacteria may survive this process, the product may be maintained at refrigerated conditions of less than forty-one degrees Fahrenheit until consumed.

Low-moisture food products may be produced by adding contents 210 to vessel 110 and agitating while drying in a closed system environment according to the present disclosure, typically until a water activity level of 0.15 to 0.5 is obtained. This method typically may maintain flavor while preserving food from degradation. Further, in some implementations, an anaerobic environment, such as flooding vessel 110 with nitrogen or argon, may be used to limit oxidation during drying.

Further, as described in further detail below, multiple grinders 100 and/or vessels 110 may be in fluid communication with a single dryer 300 (or 1100, 1200, 1300, 1400, etc.) or multiple dryers may be in fluid communication with a single grinder 100.

A grinder 100 of the present novel technology may also comprise a channel on the side of the agitation vessel 110 wherein the central paddle 135 travels up. The channel would protrude from the vertical surface for a fraction of the total vessel 110 width to promote the grinding media 123 to fall down and prevent vertical stacking of grinding media 123. Such a channel may protrude five to twenty percent of the total vessel 110 width. Thus, for a twenty-four-inch diameter vessel 110, the channel may protrude one to four inches following the radius of the mixing member 135 and/or agitator 130. The vessel 110 protrusion may then gradually merge with the vessel to prevent buildup of unprocessed contents 210 or a collection of debris.

In some implementations, it may be preferred to have the air that travels into the grinding vessel 110 opposite the side of the channel. Vessel 110 may also contain one or more temperature sensors 170 on the downward side of the process paddle 135 that may maintain thermal communication with the food product 210 below the fill line while maintaining isolation from the grinding media 123, typically enabling direct thermal monitoring of the content 210 temperature during processing. The temperature sensor 170 may be depressed from the vessel 110 surface and partially shielded from the vessel 110 contents 210 by a barrier to further prevent damage. The temperature sensor 170 may also be thermally isolated from the vessel 110 wall to provide accurate thermal readings.

In some other implementations, airflow and moisture absorption typically may be correlated with the rate of moisture release from contents 210 during processing (for example, as described above). For example, as cacao is ground by grinding media 123, moisture may be released at approximately sixteen-hundredths to forty-eight hundredths ounces of water per pound (approximately one to three percent) of contents 210 over a grinding period, and thus absorption system 300 may be sized to saturate at per typical content 210 load size (e.g., fifty pounds, one hundred pounds, etc.).

Recirculating system 300 may be used during content 210 grinding cycles, but may also be used to remove excess moisture while outgassing contents 210 (e.g., using vacuum unit 350), while dispensing ground contents 210, while filtering contents 210, and/or the like.

In some other implementations, system 100 components and/or subsets thereof may be made available as one or more kits. For example, such kits may include properly sized and ratioed grinding media 123, vessels 110, motors 130, heatsinks 111, gaskets 117, motor shafts 125, mixing members 135, drains 140, ports 145, tilt members 150, shaft seals 205, food product contents 210, heat exchangers 220, absorption system 300, pneumatic lines 310, check valves 320, absorption vessels 330, absorbent media 340, vacuum units 350, secondary containers, 410, filters 420, and/or the like.

Figure 4B:
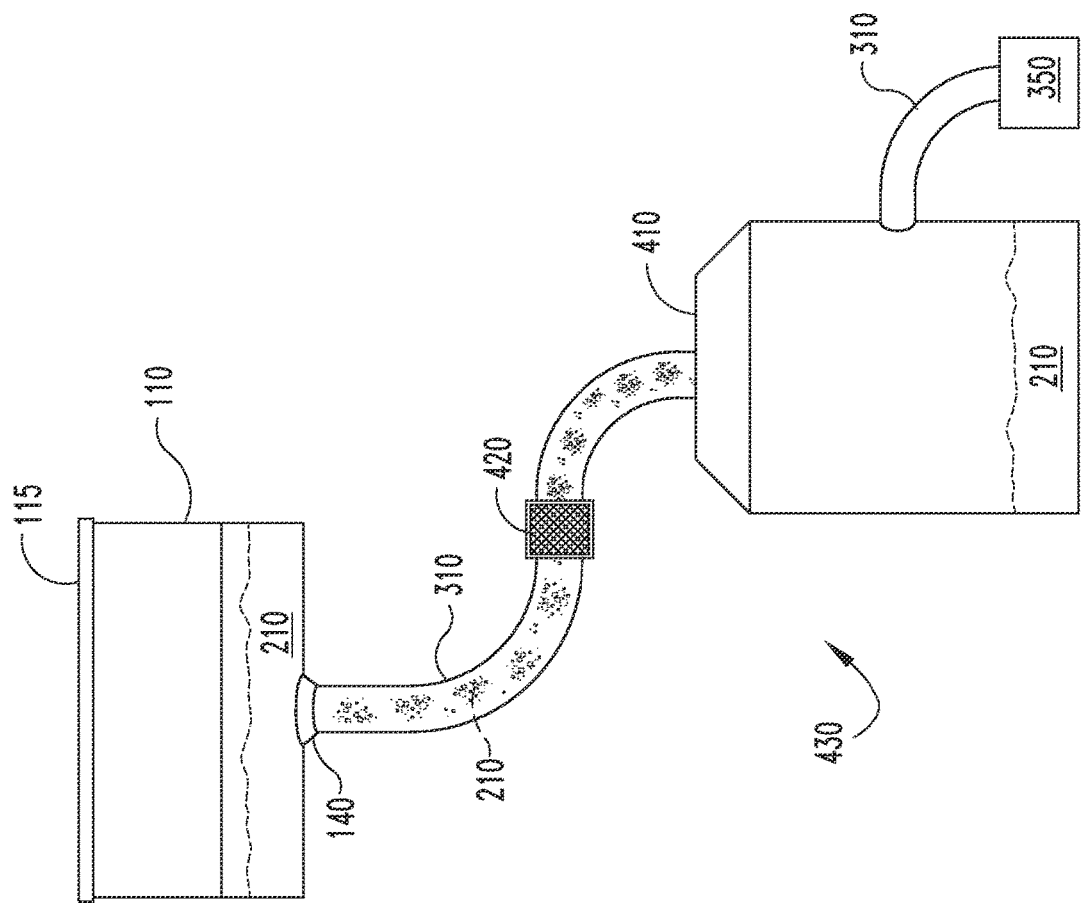
FIG. 4B depicts a fifth perspective view of the first embodiment of the present novel technology during a second dispensing embodiment.
Figure 4A:
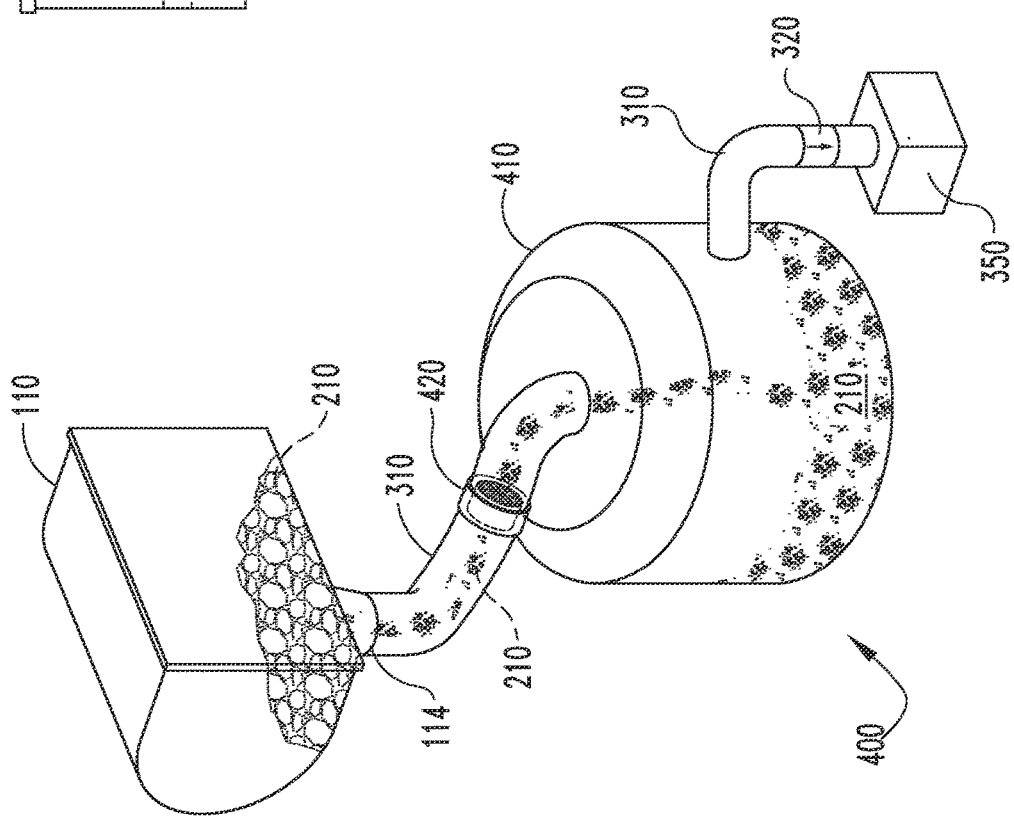
FIG. 4A depicts a fourth perspective view of the first embodiment of the present novel technology during a first dispensing embodiment.
Figure 5:
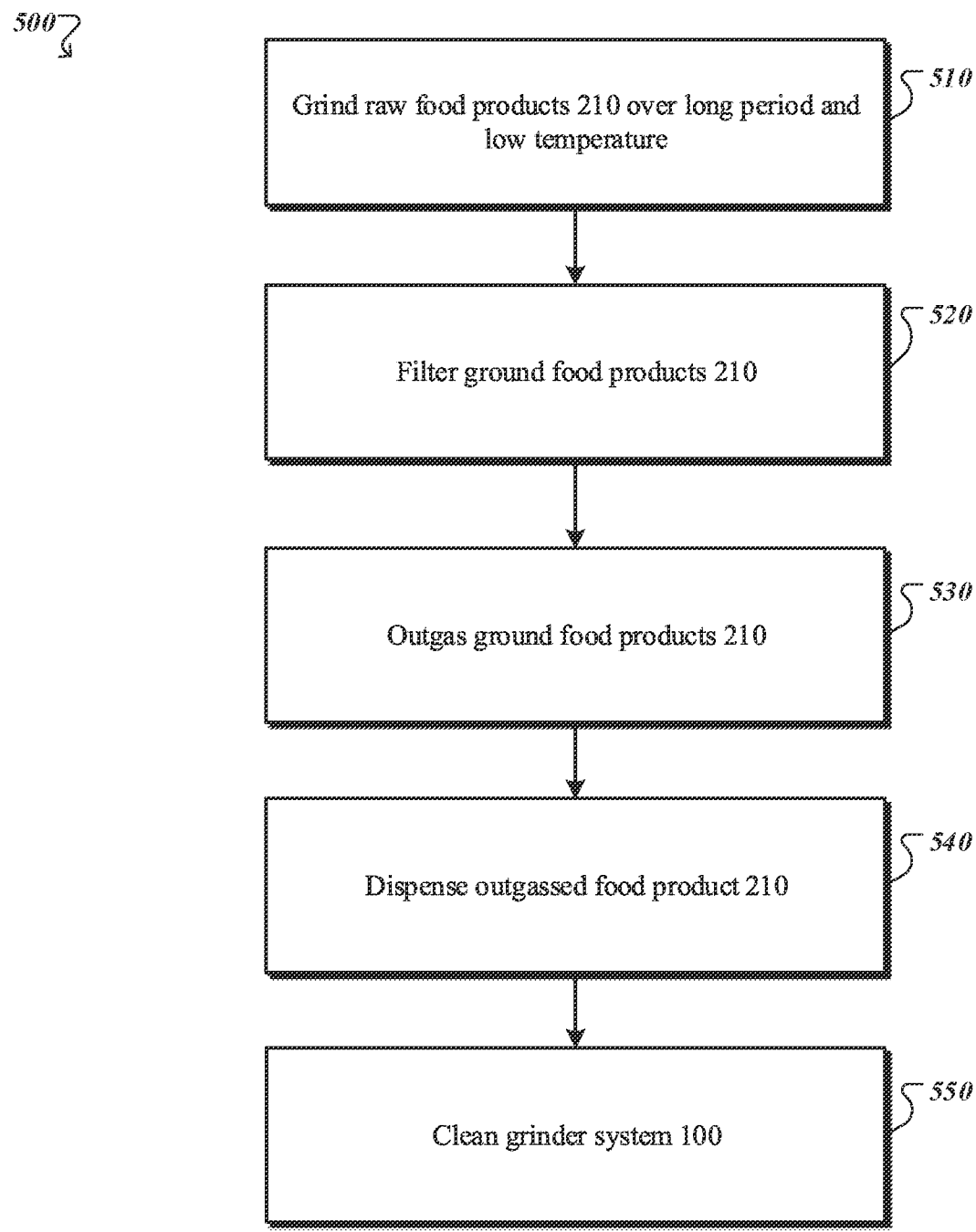
FIG. 5 depicts a first process flow diagram associated with the first embodiment of the present novel technology.
Figure 6:
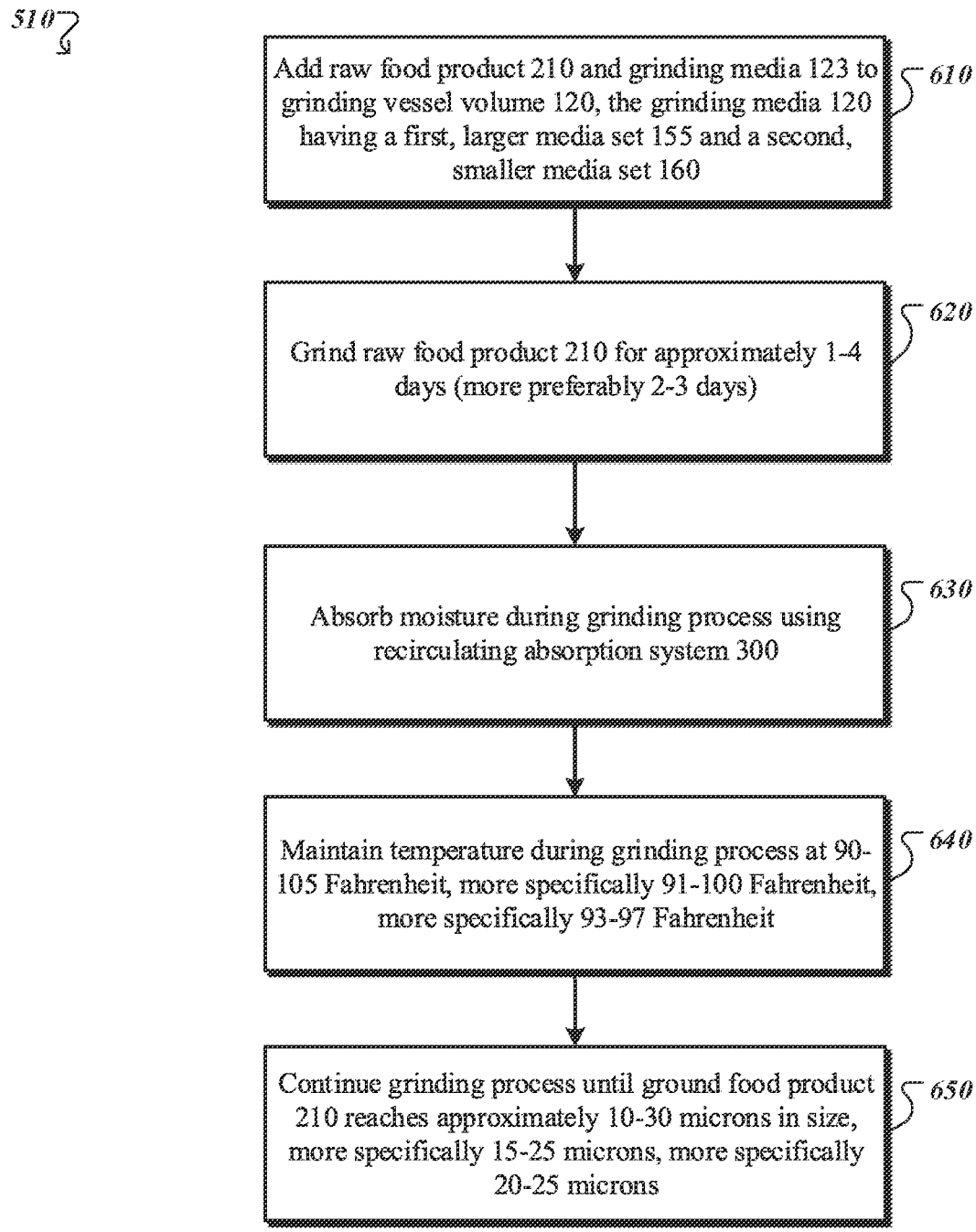
FIG. 6 depicts a second process flow diagram associated with the first embodiment of the present novel technology.
Figure 7:
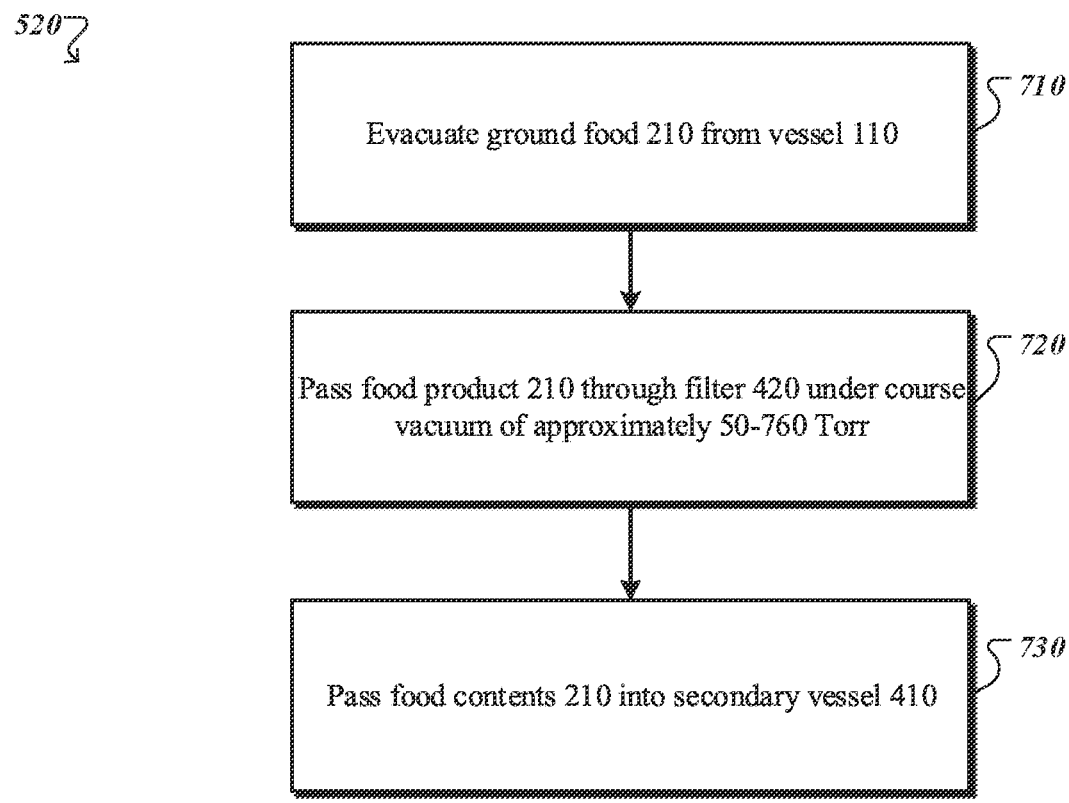
FIG. 7 depicts a third process flow diagram associated with the first embodiment of the present novel technology.
Figure 8:
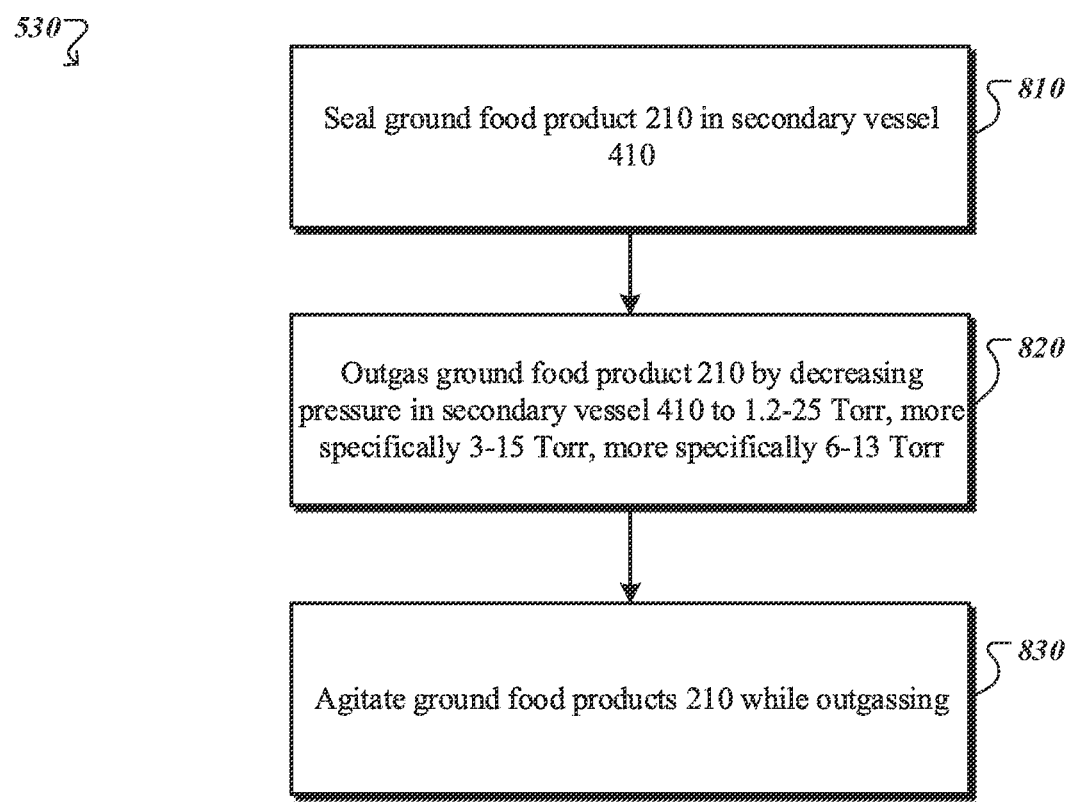
FIG. 8 depicts a fourth process flow diagram associated with the first embodiment of the present novel technology.
Figure 9:
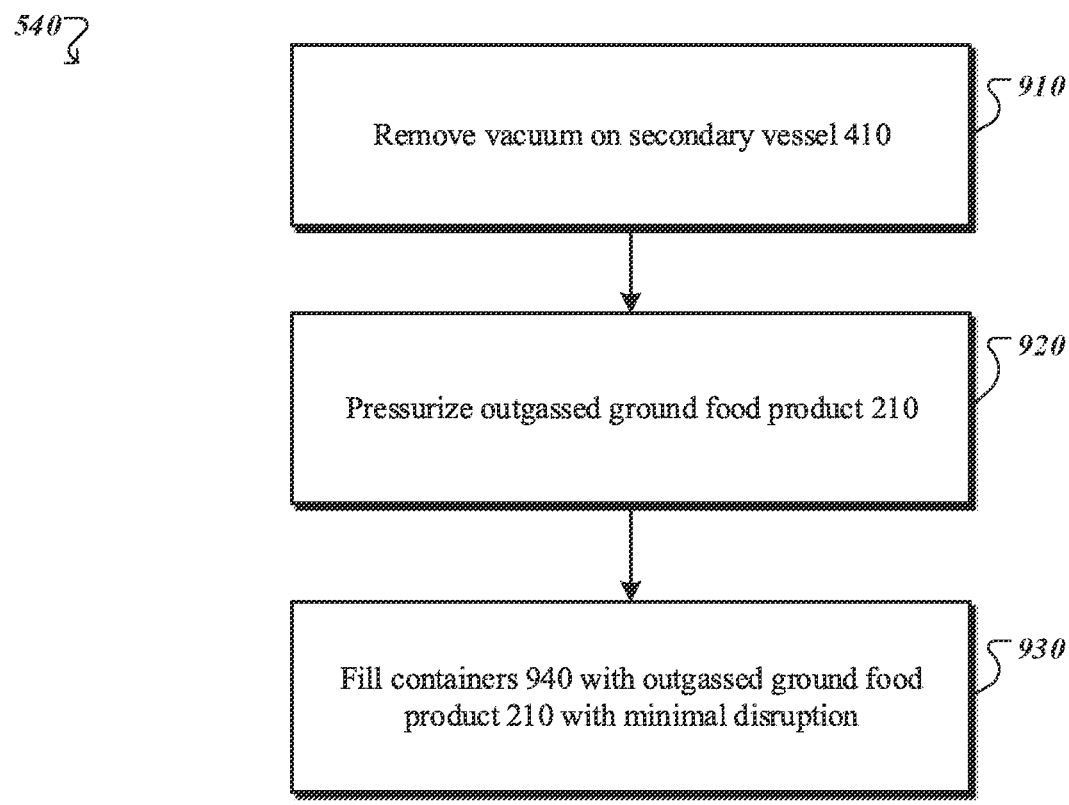
FIG. 9 depicts a fifth process flow diagram associated with the first embodiment of the present novel technology.
Figure 10:
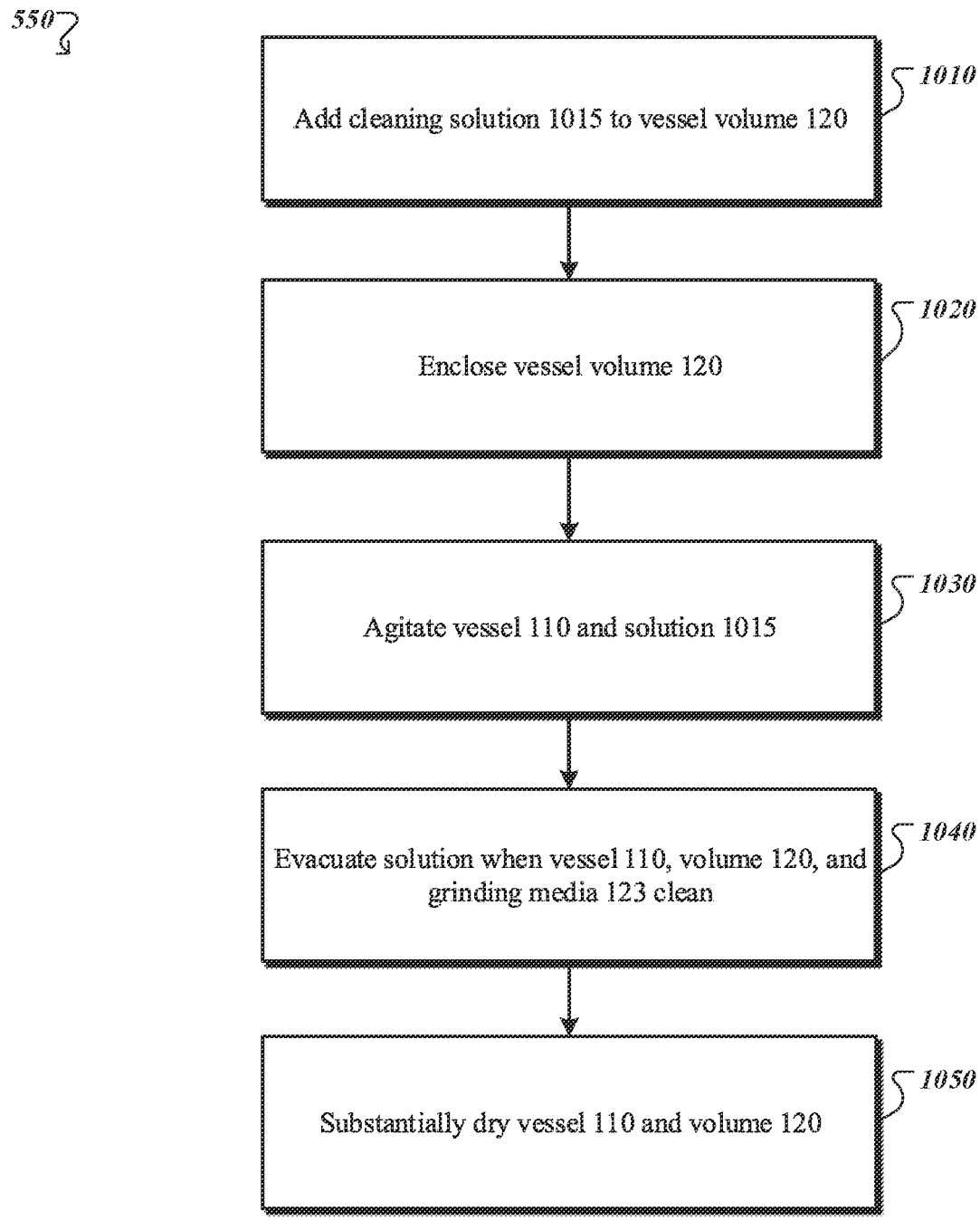
FIG. 10 depicts a sixth process flow diagram associated with the first embodiment of the present novel technology.

FIGS. 4A and 4B typically depicts system 100 during filtration and/or dispensing steps, typically including dump filtration embodiment 400, secondary vessel 410, filter member 420, and/or drain filter embodiment 430.

In dump filtration embodiment 400, vessel 110 typically may be tilted and ground contents 210 may exit vessel volume 120. In some implementations, spout 114 may be used to help direct contents 210. Contents 210 typically then may travel through one or more pneumatic lines 310 (e.g., tubing, trough, etc.) and toward one or more secondary vessels 410, typically travelling through filter member 420 before entering secondary vessel 410. As ground contents 210 may be viscous, a course vacuum (e.g., approximately fifty to seven-hundred and sixty Torr) may be pulled on pneumatic line 310 and/or secondary vessel 350 to urge contents 210 through line 310, filter 420, and into secondary vessel 350.

Filter member 420 typically may be inline vessel 110 and secondary vessel 410; however, filter 420 may also be placed inside vessel 110 (e.g., as plate member prior to exterior of vessel 110, inside secondary vessel 410 walls, and/or the like). Further, in the instance that contents 210 may be poured directly into secondary vessel 410 without using lines 310 (e.g., by tilting and pouring contents 210 from vessel 110 to secondary vessel 410, for example through an aperture/port 145), filter 420 may be placed into and/or on pour path (e.g., in and/or on port 145). Vacuum unit 350 may still pull a course vacuum on secondary vessel 410 and through filter 420 at port 145, urging contents 210 through filter 420 and port 145.

Filter member 420 typically may be constructed from a relatively rigid material (e.g., plastic, metal, composites, etc.) and sized from approximately forty to one hundred and twenty mesh, more typically sixty to one hundred mesh, and more typically eighty mesh. In some implementations, filter 420 may removable and/or cleaned (e.g., by washing, air blasting, wiping/mechanically brushing, and/or the like) to remove filtered material (e.g., cacao shells, twigs, and/or other chaff).

Conversely, in drain filter embodiment 430, contents 210 typically may exit vessel 110 through drain 140. Similar to tilt embodiment 400, ground food contents 210 typically may leave volume 120, enter pneumatic lines 310 (typically under course vacuum for speed, but may also be without vacuum and in open air), pass through filter 420, and enter secondary vessel 410. Accordingly, drain filter embodiment 430 may be useful where minimal space is available to tip vessel 110, where greater volumes and weight of contents 210 make tilting impracticable, where draining may be easier given capacities, where even lesser amounts of disturbance of contents 210 is desired (although tilt embodiment 400 typically does not substantially disturb contents 210), and/or the like.

In some implementations, agitating and/or vibrating vessel 110 while draining/dumping contents 210, typically using vibrating member 165, may act to preferentially select for the most optimally ground contents 210. For example, where contents 210 may be under- and/or overground during processing (e.g., due to being chaff, being a small amount of accidentally over/underground contents 210, etc.), underground and/or overground contents 210 typically may have higher viscosity than the desired ground food contents 210. For example, underground contents 210 may be gummy, and overground contents 210 may stick to grinding media 123. Vibration/agitation of vessel 110 while draining typically may allow lower viscosity contents 210 to slip by stuck contents 210 and/or contents 210 that otherwise are not desirable, thus allowing for harvesting of specific states of ground contents 210.

In some further implementations, agitation of vessel 110 and/or contents 210 while outgassing typically may act to improve homogenize contents 210. For example, while under vacuum outgassing may only exert substantial pressure for outgassing on approximately one foot of contents 210, which may limit the ability to outgas trapped gasses in contents 210 having greater thicknesses and/or viscosities. Agitation of contents 210 may tend to expose substantially all of contents 210 and trapped gases to outgassing, as agitation typically increases contents 210 surface area and frequency of exposure to higher gradient of pressure.

FIGS. 5-10 depict process flow diagrams associated with the present novel technology. Full-process preparation method 500 typically may include steps of grind raw food products over long period and low temperature 510, filter ground food products 520, outgas ground food products 530, dispense outgassed food product 540, and clean grinder 550.

Step 510 typically may further include steps of add raw food product and grinding media to grinding vessel 610; grind raw food product for approximately one to four days (more preferably two to three days) 620; absorb moisture during grinding process using recirculating absorption system 630; maintain temperature during grinding process at ninety to one hundred and five degrees Fahrenheit, more specifically ninety-one to one hundred degrees Fahrenheit, more specifically ninety-three to ninety-seven degrees Fahrenheit 640; and continue grinding process until ground food product reaches ten to thirty microns in size, more specifically fifteen to twenty-five microns, more specifically twenty to twenty-five microns 650.

As described above, traditional processing methods typically grind food products above one hundred and five degrees Fahrenheit, and often in the one hundred and twenty to one hundred and eighty degrees Fahrenheit range, driving off moisture and desirable volatile flavor compounds, and burning the food product (e.g., chocolate). Comparatively, the present novel system 100 and step 510 cold grind the food contents 210, which imparts far less thermal energy into the system 100 and contents 210, decreases the vapor pressure of desirable volatile compounds, decreases the reaction rate of water with the volatile compounds, and roughly equates the grinding and mixing portions of the process, which was impossible with prior art techniques and systems.

Further, step 520 typically may further include steps of evacuate ground food from vessel 710, pass food product through filter under course vacuum of approximately fifty to seven-hundred and sixty Torr 720, and pass food into secondary vessel 730.

Step 530 typically may further include steps of seal ground food product in secondary vessel 810; outgas ground food product by decreasing pressure in secondary vessel to one and one fifth to twenty-five Torr, more specifically three to fifteen Torr, more specifically six to thirteen Torr 820; and, optionally, agitate ground food products while outgassing 830.

Step 540 typically may include steps of remove vacuum on secondary vessel 910, pressurize outgassed ground food product 920, and fill containers 940 with outgassed ground food product with minimal disruption 930.

During filling step 930, ground and filtered contents 210 typically may be dispensed into one or more containers 940. For example, pouches may be filled through self-sealing valves (e.g., silicone cross slit valves, etc.). In one implementation, the contents 210 may be dispensed through a smaller sized dispenser (e.g., having a five-millimeter outer diameter and four and a half millimeter inner diameter). The resulting dispensing accelerates the contents 210 from a large area to a small area at a high pressure at approximately one-hundred pounds per square inch gauge pressure (PSIG) or more, then back to a low pressure once in the container, simultaneously acting to further cavitate and homogenize contents 210 in the container.

Step 550 typically may further include steps of add cleaning solution 1015 to vessel volume 1010, close volume 1020, agitate vessel and solution 1030, evacuate solution when vessel, volume, and grinding media clean 1040, and substantially dry vessel and volume 1050. Evacuation of solution in step 1040 typically may occur via drain 140, port 145, and/or tipping vessel 110. Drying in step 1050 typically may occur using recirculating drying system 300, but may also be accomplished using forced air into vessel 110, direct/indirect heating of vessel 110, and/or the like.

The present novel system 100 and method 550 typically allows vast improvements in quality control and food safety over prior art systems and methods, as system 100 may be fully cleaned, sterilized, and dried before starting a new batch. Further, grinding media 123 and vessel 110 may be fully cleaned and dried, reducing flavor carryover from one grinding process contents 210 to the next, whereas cleaning existing systems thoroughly is simply not practicable or possible without massive cost and time investment.

Further, FIGS. 11A-18 typically depict moisture removal aspects and embodiments of the present novel technology, which in some implementations may be combined with grinding system 100.

Figure 11B:
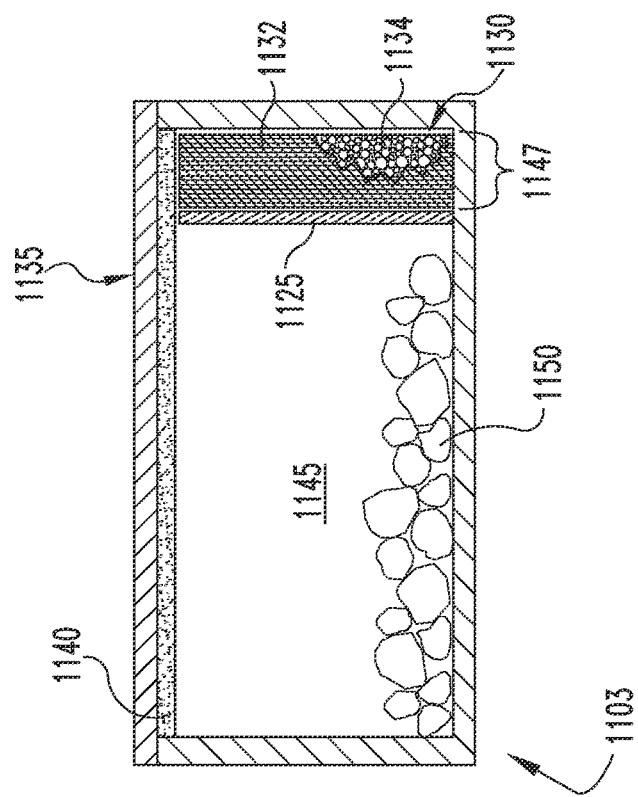
FIG. 11B depicts a side view of the first example moisture removal system of FIG. 1A.
Figure 11A:
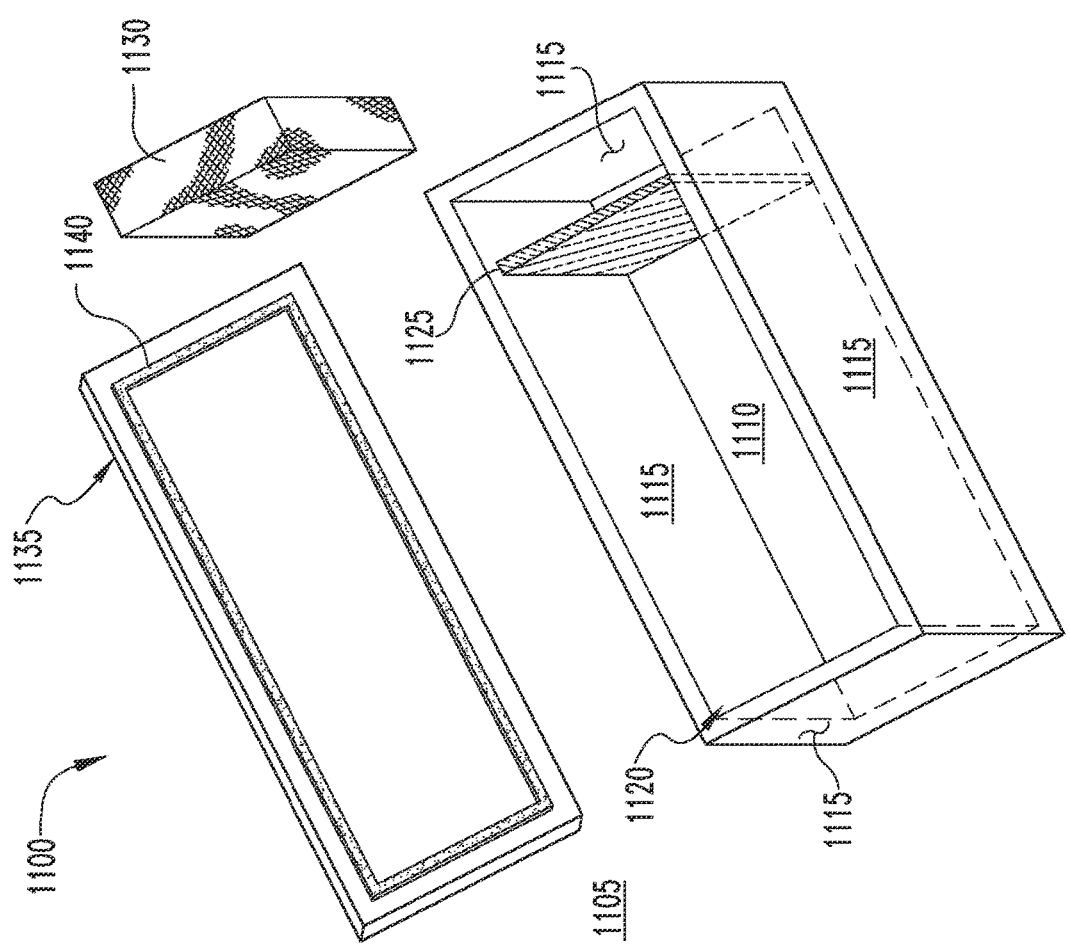
FIG. 11A depicts a first perspective view of a first example moisture removal system in a passive embodiment.

FIGS. 11A and 11B depicts one embodiment of the present novel technology, typically in a standalone passive variant. Absorption system 1100 typically may include container 1103 (to be separated from external environment 1105) typically having base member 1110, side members 1115, open side 1120, dividing member 1125, absorption cartridge 1130, cartridge wall 1132, absorption media 1134, lid member 1135, lid gasket 1140, container volume 1145, secondary volume 1147, and/or contents 1150.

Container 1103, typically may be constructed of composites, plastics, stainless steel, and or the like, with base member 1110 as a lower face and side members 1115 extending therefrom to form sides, typically leaving open side 1120 uncovered and allowing fluidic transmission or communication between external environment 1105 and container volume 1145. Open side 1120 may be closed and typically may be substantially sealed from external environment 1105 by placing lid member 1135 atop container 1103 at open side 1120. In some implementations, lid member 1135 may further have lid gasket 1140 disposed between lid member 1135 and container 1103 to further enable pneumatic seal between external environment 1105 and container volume 1145.

Dividing member 1125 typically may be constructed of similar materials as container 1103 and may divide container volume 1145 further into a secondary volume 1147. Dividing member 1125 typically may also be vented, ported, and/or otherwise having perforations allowing fluidic exchange between container volume 1145 and secondary volume 1147.

Drying cartridge 1130 typically may be constructed of similar materials as container 1103 and dividing wall 1125, with cartridge walls 1132 enclosing and allowing fluidic communication with a quantity of absorption media 1124. Absorption media 1134 typically may absorb moisture via chemical (e.g., quick lime and components that absorb via chemical reaction) and/or physical absorption methods (e.g., silica gels, molecular sieves, and/or the like). For example, the present novel system 1100 may use molecular sieves sized from one to twenty-five angstroms, more typically two to ten angstroms, and more typically three to five angstroms. Molecular sieves as absorbent media 1134 typically may absorb the excess water, but will leave volatile acid compounds that make up the complex flavors of contents 1210 (e.g., blueberry, raspberry, and/or the like notes of high-quality chocolate).

Typically, water from contents 1150, which typically may be located in container volume 1145, may diffuse into air and then into absorption media 1134, which typically may be within secondary volume 1147. In other implementations, container volume 1145 may encompass entirety of container 1103 interior, omitting secondary volume 1147, and cartridge may be placed among contents 1150. In still further implementations, absorbent media 1134 may be placed directly amongst contents 1150, omitting cartridge 1130. In such a cartridge-free implementation, contents 1150 may then be separated from media 1134 (e.g., using sieve, colander, forced air separation, and/or the like).

Figure 12:
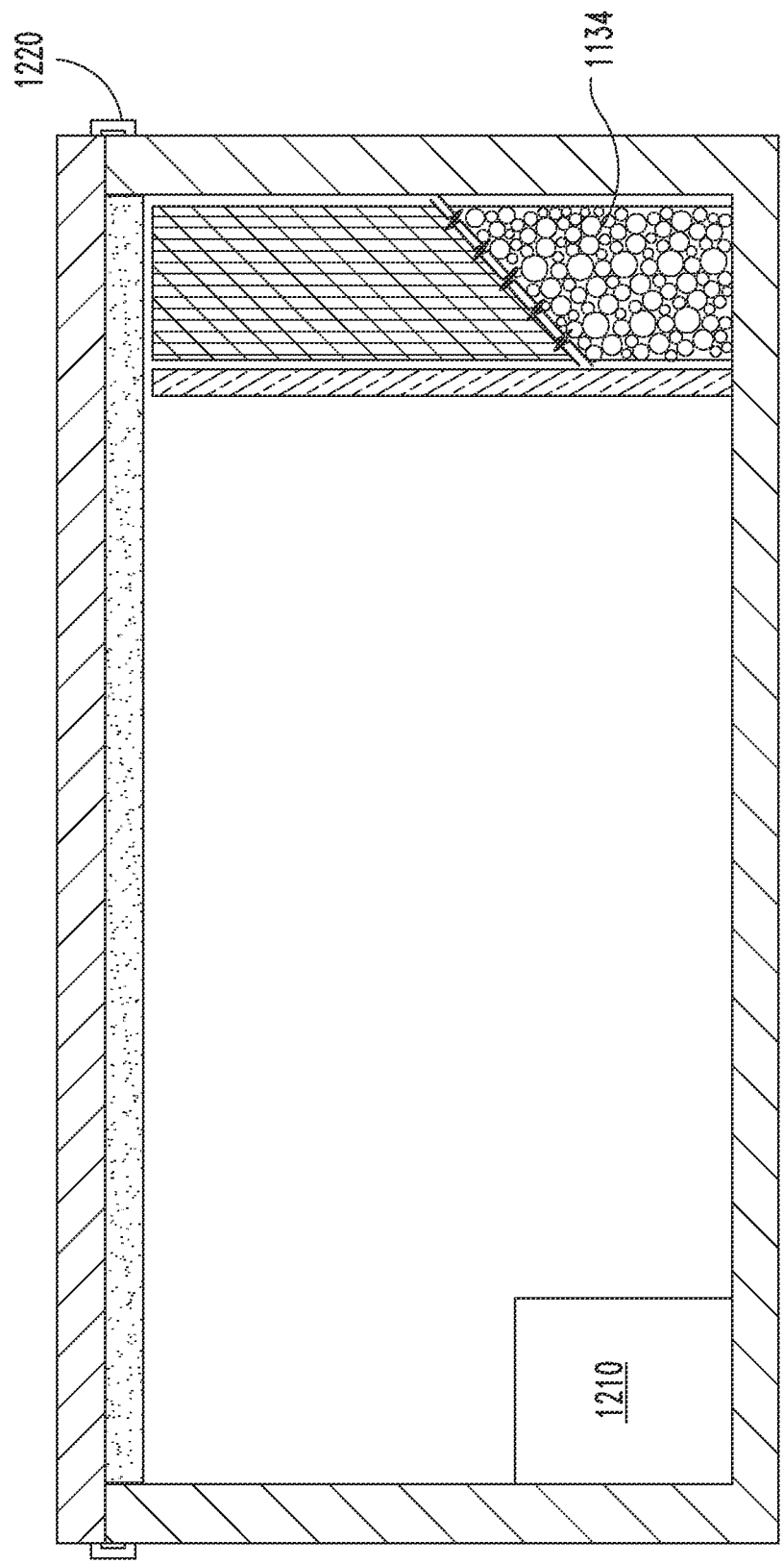
FIG. 12 depicts a second example moisture removal system in an active embodiment.

FIG. 12 depicts another embodiment of the present novel technology, typically in a contained, active variant. Active absorption system 1200 typically may also have active circulation member 1210 and/or latch member 1220, which may in some implementations be similar to recirculating drying system 300.

Active circulation member 1210 typically may be one or more fluid moving devices (e.g., fans, blowers, impellers, etc.) to increase fluid circulation within container 1103. For example, circulation member 1210 may increase fluid flow through dividing member 1125, increase exposed surface area of contents 1150 and/or media 1134, increase fluid flow through cartridge 1130, and/or the like. Such active flow typically may increase dehumidification rates and correspondingly decrease time to reaching desired dehumidification thresholds.

In some implementations, for example to increase the holding force between lid 1135 and container 1103, one or more latch members 1220 may be used. Such latch members 1220 typically may be pivoted down and/or otherwise positively provide interference to hold lid 1135 to container 1103. In some other implementations, lid 1135 may screw onto container 1103, be secured using one or more fasteners, and/or otherwise attached to similarly increase the hold between lid 1135 and container 1103. Such increased force may be useful where, for example, circulation member 1210 and/or recirculation member 1350 (described below) differentially pressurize container volume 1145 and/or secondary volume 1147, which may decrease the pneumatic integrity of container volume 1145 and/or secondary volume 1147.

Figure 13:
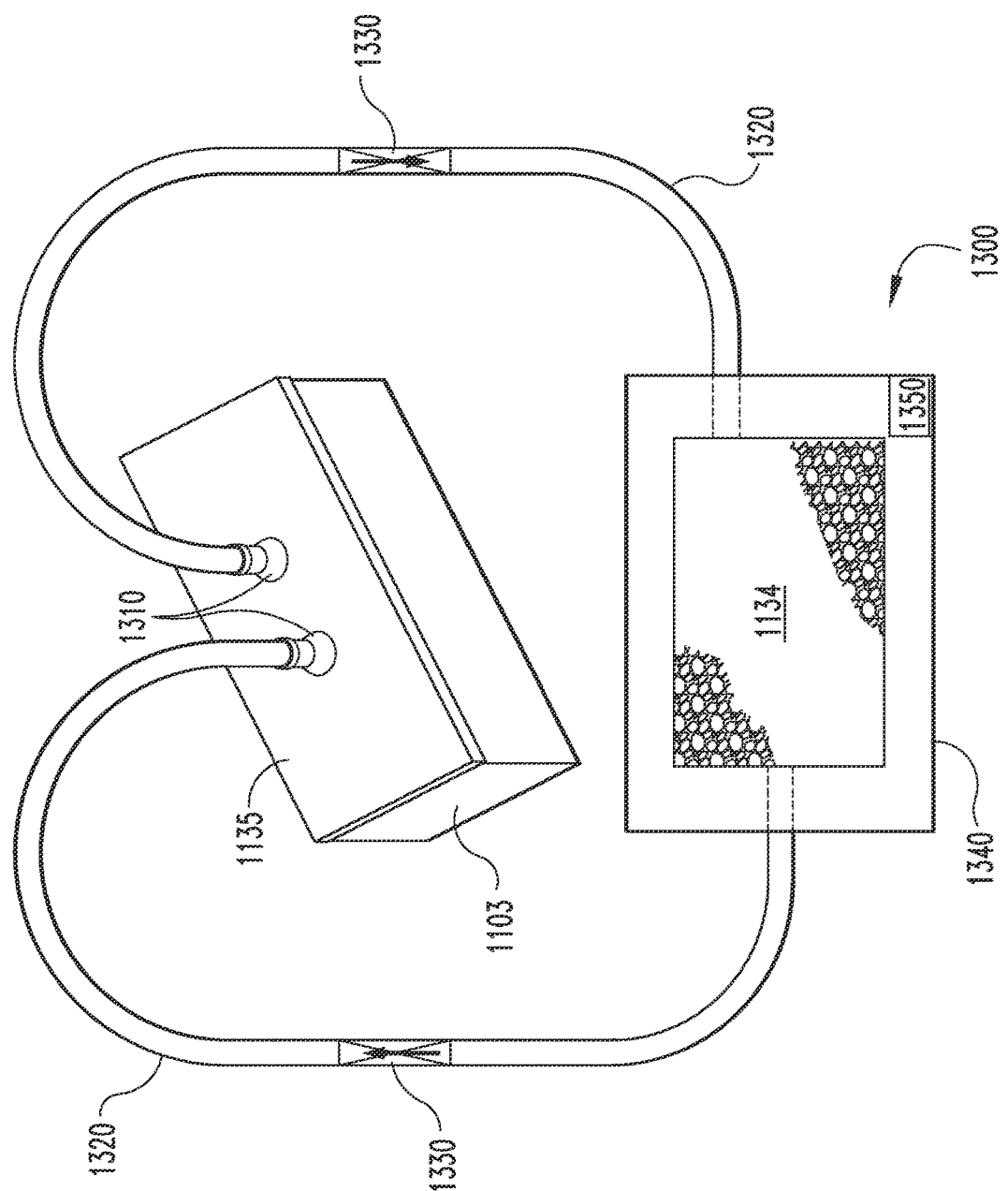
FIG. 13 depicts a third example moisture removal system in a bulk active embodiment.

FIG. 13 typically depicts recirculating, bulk absorption system 1300, which typically may connect to system 1100 via one or more ports (e.g., port members 1310), again in some implementations being similar to recirculating drying system 300. Pneumatic lines 1320 (typically known in the art) then connect ports 1310 to absorption vessel 1340, which typically may be constructed of composites, plastics, stainless steel, and or the like, and typically may be pneumatically sealed and typically contains absorbent media 1134 and/or cartridge 1130. Some implementations may include one or more check valves 1330 in pneumatic lines to help direct airflow. Moisture-laden air typically may be drawn from container volume 1145, passing through pneumatic lines 1320, entering absorption vessel 1340, passing through absorbent media 1134, absorbent media 1134 absorbing the moisture from the air, and then returning through pneumatic lines 1320 back into vessel volume 1145. In some other implementations, recirculation member 1350 (e.g., a blower unit, vacuum unit, and/or the like) may be used to pull air through pneumatic lines 1320 and/or be used as blower unit 1350 to ingress/egress air through pneumatic lines 1320, absorption vessel 1340, and absorbent media 1134. In still further implementations, active circulation member 1210 may act as, or in conjunction with, recirculation member 1350.

In some implementations, absorption system 1300 also may include absorption media 1134 regeneration capabilities. For example, one or more desiccant regeneration methods (e.g., heating absorbent media 1134 to vaporize absorbed water, diffusing water via dehumidifier, etc.) may be used to recharge media 1134. In another implementation, absorption system 1300 may have more than one bay of media 1134 in absorption vessel 1330 (and/or one or more vessels 1330, each having one or more media 1134 bays), which may be actuated between. For example, system 1300 may have a plurality of bays (depicted in FIG. 14B as 1400A-1400D) of absorbent media 1134, each bay being selectable via open/close valves, blast gates, electronically actuated gates, and/or the like, and system 1300 allow air to flow through the first bay until the first bay's media 1134 is saturated. At this point, system 1300 may close the first bay and open the second bay, while also activating a recharging system in the first bay to desaturate the first bay's media 1134, and may then continue through the various bays. Such system 1300 may be scaled (e.g., having two, five, ten, etc. bays/absorption vessels 1340) to maintain saturation and/or recharge rates while keeping air in container 1103 at a sufficiently low moisture content. This bay implementation is described further below.

In other implementations, absorption system 1300 and/or media 1134 may be manually recharged. For example, as above one or more media 1134 bays may be available, and/or one or more media 1134 trays may be removable/replaceable. Thus, as one tray is saturated, an operator may halt and/or airflow through vessel(s) 1340, remove media 1134 tray, place media 1134 tray in an oven to recharge media 1134, and then replace recharged media 1134 tray into system 1300. In other implementations, vessel 1340 may be replaced entirely by disconnecting lines 1320 from depleted vessel 1340 and then connecting to new vessel 340.

Further, in some implementations, one or more air filtration elements may be used to prevent dust and/or debris from exiting absorption vessel 1340 and returning to container 1103 to mix with contents 1150. For example, such an air filter element may be preferably less than ten micrometers, more preferably less than five micrometers, and still more preferably less than one micrometer for particle size filtration.

Still further implementations may include one or more sensors 170 (e.g., airflow sensors, humidity sensors, and/or the like) to measure airflow, moisture content, pressure, and/or the like of air flowing through lines 1320, ports, valves, and/or vessel(s) 1340. Sensor data may then be used to trigger alarms (e.g., to change media 1134 tray, switch media 1134 bay actuators, and/or the like), automatically actuate ports/valves, switch to new media 1134, initiate/stop recharging of media 1134, and/or the like. Further examples are described elsewhere in this application.

In some implementations, airflow and moisture absorption typically may be correlated with the rate of moisture release from contents 1150 during processing. For example, as a particular herb is dehydrated may occur at a linear rate, thus allowing system 1300 to be sized and/or regenerated accordingly. In other implementations, the rate of dehumidification may exponentially decrease over time, and thus may be alternatively size and/or regenerated accordingly.

Figure 14B:
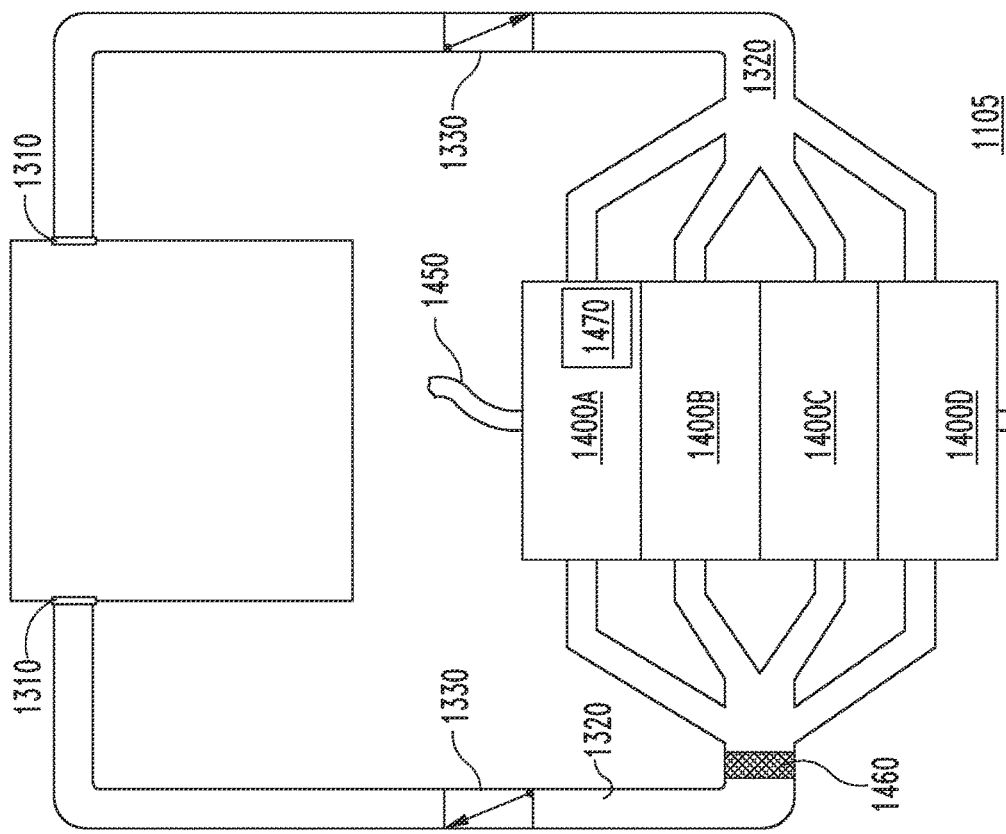
FIG. 14B depicts a fifth example moisture removal system in a bulk active regeneration embodiment using a regenerative system from FIG. 14A.
Figure 14A:
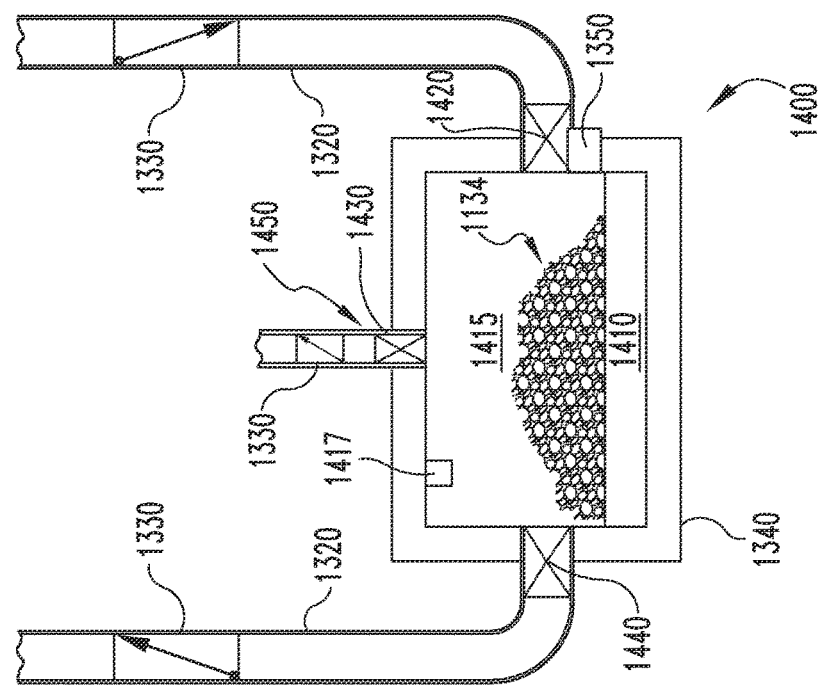
FIG. 14A depicts a fourth example moisture removal system incorporating regeneration.
Figure 15:
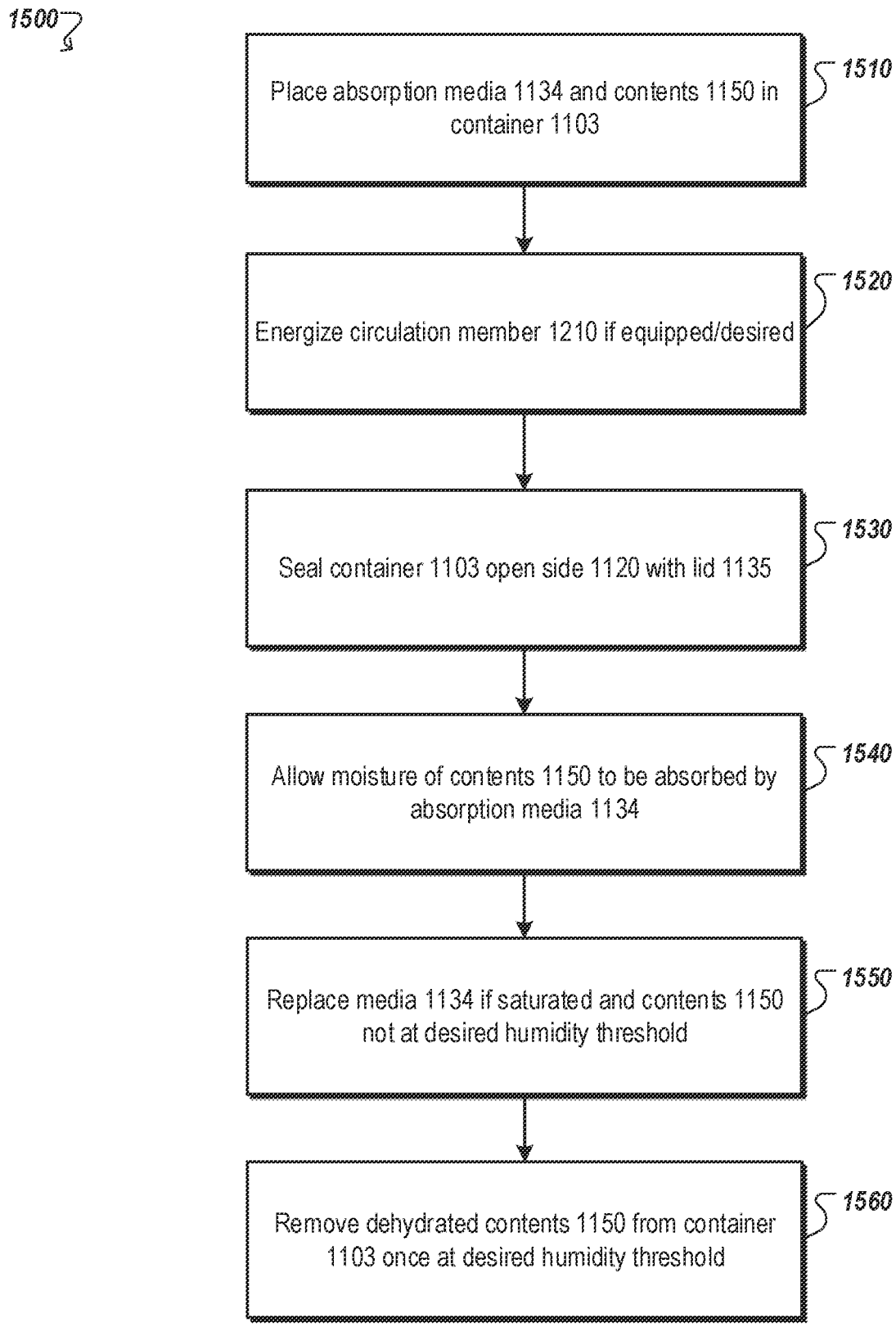
FIG. 15 depicts a first example process flow associated with the present novel technology.
Figure 16:
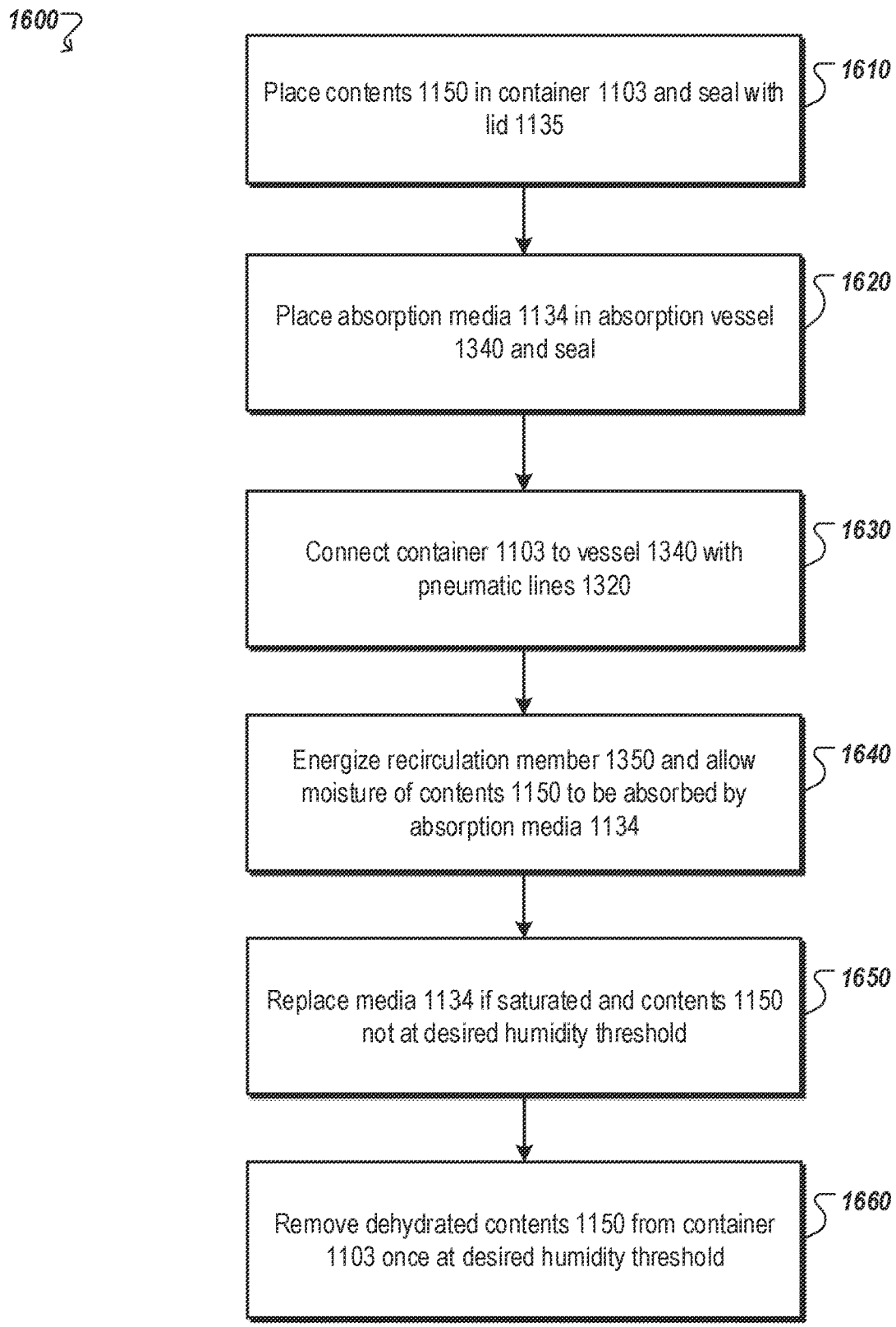
FIG. 16 depicts a second example process flow associated with the present novel technology.
Figure 17:
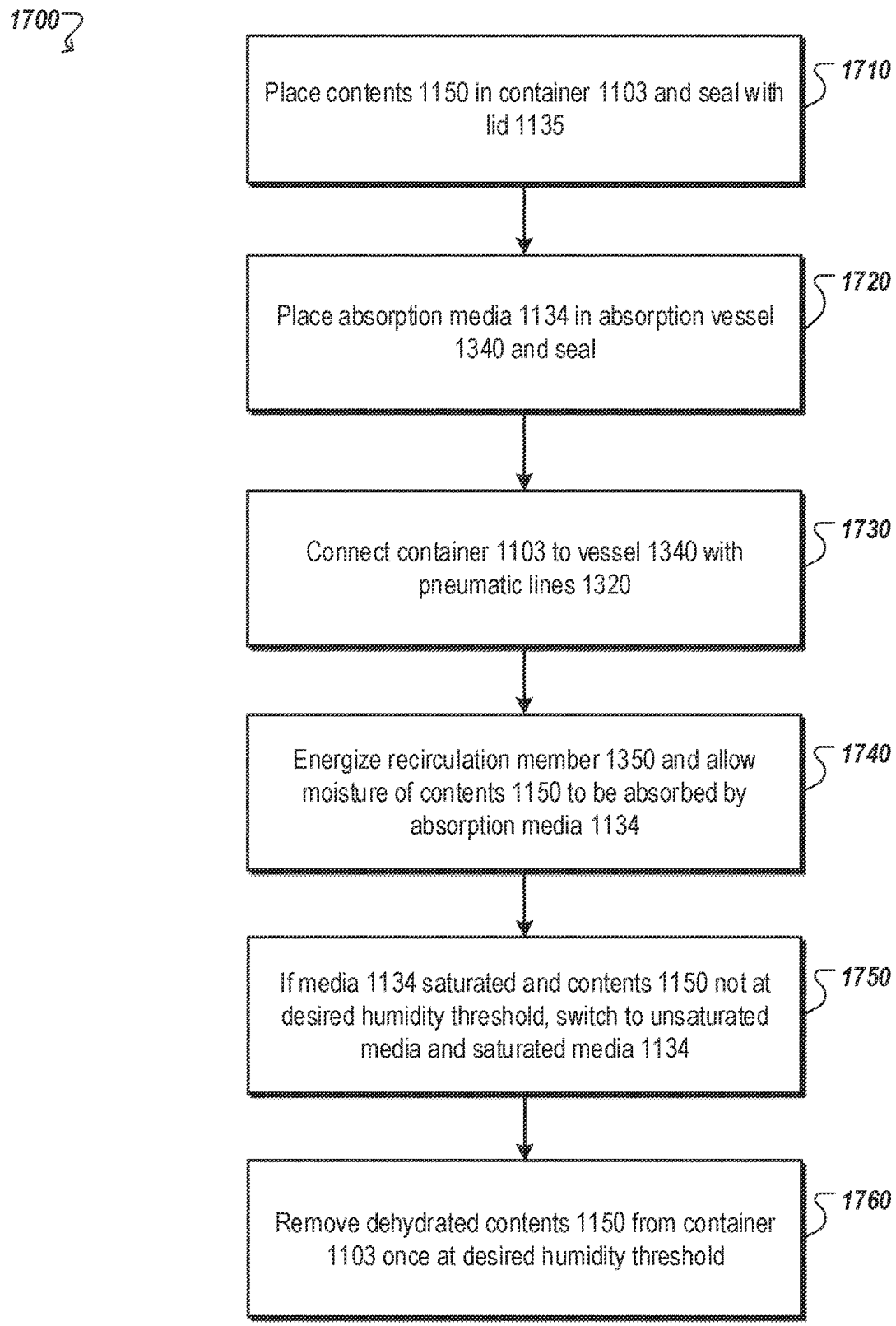
FIG. 17 depicts a third example process flow associated with the present novel technology.

FIGS. 14A and 14B typically depict the present novel technology incorporating regenerative system 1400, which typically may include regeneration unit 1410, media volume 1415, input valve 1420, exhaust valve 1430, output valve 1440, exhaust member 1450, filter member 1460, and/or access panel 1470. FIG. 14A typically depicts an individual regenerative system 1400, and FIG. 14B typically depicts a multiple regenerative system 1400 design allowing.

Lines 1320 typically may be securely connected to valves 1420, 1440 in fluid-tight connections as known in the art. Input valve 1420 typically may allow multiple directions of egress for incoming air from line 1320 (e.g., to media 1134 in media volume 1415, to vessel 1340, etc.), exhaust valve 1430 typically may receive multiple air ingress paths (e.g., from media volume 1415, from vessel 1340, etc.), and output valve 1440 typically may receive multiple air ingress paths (e.g., from media volume 1415, from vessel 1340, etc.). However, in other embodiments, valves 1420, 1430, 1440 may be otherwise configured. Vessel 1340 typically may be substantially fluid-tight except for input valve 1420, output valve 1440, and exhaust valve 1430, which typically may be substantially fluid-tight when in a closed position. In some implementations, exhaust member 1450 may be fitted to or with exhaust valve 1430 to direct, diffuse, flow, and/or otherwise divert flow.

Filter member 1460 typically may be one or more air filters located before and/or after media 1134 to remove airborne particulates and/or media 1134, which typically may extend the life of media 1134, decrease maintenance, and/or maintain contents 1150 integrity. As above, such filters 1460 may be preferably less than ten micrometers, more preferably less than five micrometers, and still more preferably less than one micrometer for particle size filtration.

Access panel 1470 typically may be one or more removable panels 1470 in vessel 1340 to allow access to media 1134, volume 1415, and/or regeneration unit 1410. Panels 1470 typically may maintain a substantially airtight seal when in place, for example using one or more gaskets 1140 and/or retainer structures. Panels 1470 then may be removed for servicing system 1400, in some implementations using locking retainers or the like, and replaced once serviced.

Regenerative system 1400 typically may be similar to bulk recirculating system 1300, further adding media 1134 regeneration using regeneration unit 1410 in media volume 1415. Line 1320 typically may connect to vessel 1340 and use input valve 1420 to direct incoming air through vessel 1340 and/or media volume 1415. Air may then pass dried through output valve 1440 and into line 1320 back to container 1103, and/or undried through vessel 1340, output valve 1440, and line 1320 before returning to container 1103.

Typically, input valve may direct air either fully into media volume 1415 or fully into vessel 1340; however, in some implementations, partial flow redirection (i.e., where some air passes through media volume 1415 and where the rest passes undried through vessel 1340) may be used when, for example, full humidification may overly dry air, may outpace water output of contents 1150, and/or the like.

When media 1134 is being used to dry incoming air, input valve 1420 typically may allow air to pass through line 1320, through media 1134 in media volume 1415, and out through output valve 1440. When media 1134 is saturated and/or media volume 1415 otherwise bypassed, input valve 1420 typically may allow air to pass through vessel 1340 (i.e., around media 134 area), and out through output valve 1440. In some implementations, air may also be diverted from vessel 1340 and out exhaust valve 1430 and/or exhaust member 1450 as well. During such bypass operations, media 1134 may be removed, replaced, and/or otherwise maintained from media volume 1415, which typically may be accessible through one or more access panels 1470 on vessel 1340.

When media 1134 is undergoing regeneration, regeneration unit 1410 typically may increase in temperature and raise the temperature of media 1134 and media volume 1415 above a desired temperature threshold (e.g., one hundred and fifty degrees Fahrenheit, two hundred and twelve degrees Fahrenheit, three hundred degrees Fahrenheit, three hundred and fifty degrees Fahrenheit, etc.). The increase in heat may then cause the saturated media 1134 to release the absorbed moisture into media volume 1415 and then out through exhaust valve 1430 and/or exhaust member 1450. Valve 1430 typically may be opened to external environment 1105 upon the start of the regeneration process; however, in other implementations, valve 1430 may be opened during the regeneration process (e.g., once temperature threshold is reached).

Regeneration typically may continue for a set period of time (e.g., where regeneration time is a known value) and then valve 1430 may close, substantially sealing media volume 1415 from external environment 1105, while in other implementations, one or more sensors 1417 (humidistat, air flow sensors, thermostat, etc.) may be used to sense the dehumidification of media 1134 and control regeneration unit 1410, valves 1420 and 1430, and/or the like. For example, sensors 1417 may detect humidity above a threshold (e.g., seventy-five percent, ninety percent, ninety-nine percent, etc.) and close input valve 1420. Regeneration unit 410 then may energize and begin heating up to a desired temperature threshold, and once sensor 1417 detects that desired temperature has been reached exhaust valve 1430 may be opened. Then, once sensor detects that humidity has reached a floor threshold (e.g., zero percent, ten percent, twenty-five percent, etc.), regeneration unit 1410 may shut off, exhaust valve 1430 may close, and input valve 1410 may again open (and/or once sensor 1417 returns to operating temperatures, so as to not add excess heat to contents 1150). Alternatively, exhaust valve 1430 may open as soon as input valve 1420 closes. In some further implementations, some air may enter through an input valve 1420 while media 1134 is being regenerated to provide active air flow, while in other implementations, regeneration may expel air through exhaust valve 1420 by thermal convection (e.g., using fluid bypass in valve 1420, using a concentric exhaust valve 1420 or exhaust member 1450, and/or the like).

In FIG. 14B, a multiple regeneration design using multiple regenerating systems 1400 is depicted where 1400A is a first system, 1400B is a second system, 1400C is a third system, and 1400D is a fourth system, and where each system 1400A-1400D is independently controllable. In such a design, air may be directed through every bay 1400A-1400D, a single bay, and/or any subset thereof.

In operation, for example, bay 1400A may open its input valve 1420 and output valve 1440, while the bays 1400B-1400D remain closed. Air may flow through 1400A's input valve 1420, drying through media 1134, and exiting 1440A's output valve 1440 before returning to container 1103. Once bay 1400A's media 1134 is saturated to a threshold level, 1400's input valve 1420 and output valve 1440 may close, exhaust valve 1430 may open, regeneration unit 1410 may energize, and regeneration may commence of 1400A's media 1134. At substantially the same time as bay 1400A closes its valves 1420 and 1440, bay 1400B may open its input valve 1420 and output valve 1440 to continue dehumidification while bay 1400A regenerates. Thus, a constant dehumidification process may be achieved, and the number of bays 1400, volume of media 1134, air flow rates, and/or the like may be tuned to optimize humidity removal and consistency.

In other implementations, bays 1400 may be opened through access panels 1470 to remove and/or replace media 1134, service regeneration unit 1410, and/or the like. For example, where one or more bays 1400 does not have a regeneration unit 1410, media 1134 may be removed, regenerated in an external regeneration unit, and then returned to bay 1400 for continued service.

Compared to prior art that dries under heat, as discussed above, the output dried product 1150 of system 1100 typically may be of much higher quality and far more representative of the input product 1150 as the present novel system 1100 does not drive off volatiles or scorch the contents 1150.

Additionally, in the case of prior systems and methods using a vacuum to extract moisture, such vacuum removal may often also act to simultaneously extract some of the desirable volatile compounds from contents 1150, rather than only the moisture as typically occurs with the present novel technology. System 1100, conversely, may often operate at or near atmospheric pressure in order to reduce the diffusion of volatiles from contents 1150 under vacuum. Operating at the atmospheric pressure typically may allow a relatively predictable rate of diffusion from contents 1150 into the fluid (typically gaseous) stream, and then into absorption media 1134, while maintaining substantially all of the volatile compounds and characteristics of contents 1150.

In some further implementations, for example where extra retention of volatiles from contents 1150 may be desired (e.g., exceptionally high quality goods, very subtle/delicate volatiles, etc.), system 1100 may be operated at a pressure above atmospheric pressure to further reduce loss of volatiles from contents 1150. Such a configuration typically may limit diffusion of both moisture and volatiles from contents 1150 into the diffusing fluid (i.e., moving air in this instance) by typically driving moisture and volatiles into contents 1150 using the higher pressure and simultaneously reducing egress of the same. For what small amount of diffusive egress still may occur, the diffusive fluid typically may rapidly reach saturation of both the volatiles and moisture, thus resulting in net zero further diffusion once saturation is reached. However, due to the absorption media 1134 selectively removing the moisture (and leaving the volatiles), with the fluid flowing through input valve 1420 having a higher moisture content and the fluid leaving through the output valve 1430 typically having a lower moisture content (due to flowing past absorption media 1134), moisture may constantly be removed from the fluid and the fluid's moisture saturation point may never be reached, resulting in continual removal of moisture without any significant removal of volatiles from contents 1150. Thus, system 1100 may further preserve the integrity and quality of contents 1150 through the drying process far greater than any current systems or methods.

FIGS. 15-18 depict example methods using the present novel technology. Passive (or optionally active) container embodiment 1500 typically may include place absorption media 1134 and contents 1150 in container 1103 step 1510, energize circulation member 1210 if equipped/desired step 1520, seal container 1103 open side 1120 with lid 1135 step 1530, allow moisture of contents 1150 to be absorbed by absorption media 1134 step 1540, replace media 1134 if saturated and contents 1150 not at desired humidity threshold step 1550, and/or remove dehydrated contents 1150 from container 1103 once at desired humidity threshold step 1560.

Recirculating embodiment 1600 typically may include place contents 1150 in container 1103 and seal with lid 1135 step 1610, place absorption media 1134 in absorption vessel 1340 and seal step 1620, connect container 1103 to vessel 1340 with pneumatic lines 1320 step 1630, energize recirculation member 1350 and allow moisture of contents 150 to be absorbed by absorption media 1134 step 1640, replace media 1134 if saturated and contents 1150 not at desired humidity threshold step 1650, and/or remove dehydrated contents 1150 from container 1103 once at desired humidity threshold 1660.

Regenerating recirculation embodiment 1700 typically may include place contents 1150 in container 1103 and seal with lid 1135 step 1710, place absorption media 1134 in absorption vessel 1340 and seal step 1720, connect container 1103 to vessel 1340 with pneumatic lines 1320 step 1730, energize recirculation member 1350 and allow moisture of contents 1150 to be absorbed by absorption media 1134 step 1740, if media 1134 saturated and contents 1150 not at desired humidity threshold, switch to unsaturated media and saturated media 1134 step 1750, and/or remove dehydrated contents 1150 from container 1103 once at desired humidity threshold step 1760.

Figure 18A:
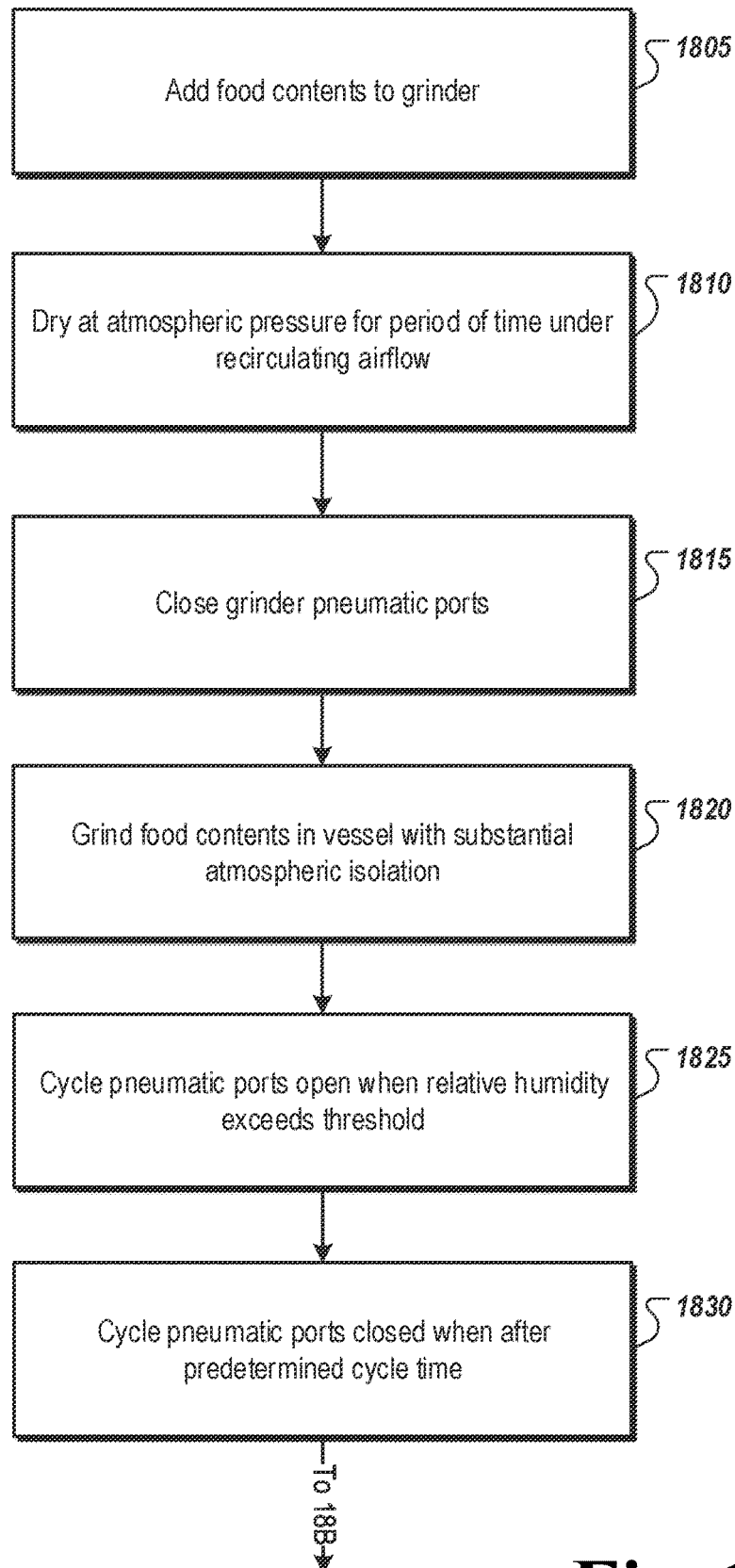
FIGS. 18A and 18B typically depict cyclic grinding process flow associated with the above embodiments.
Figure 18B:
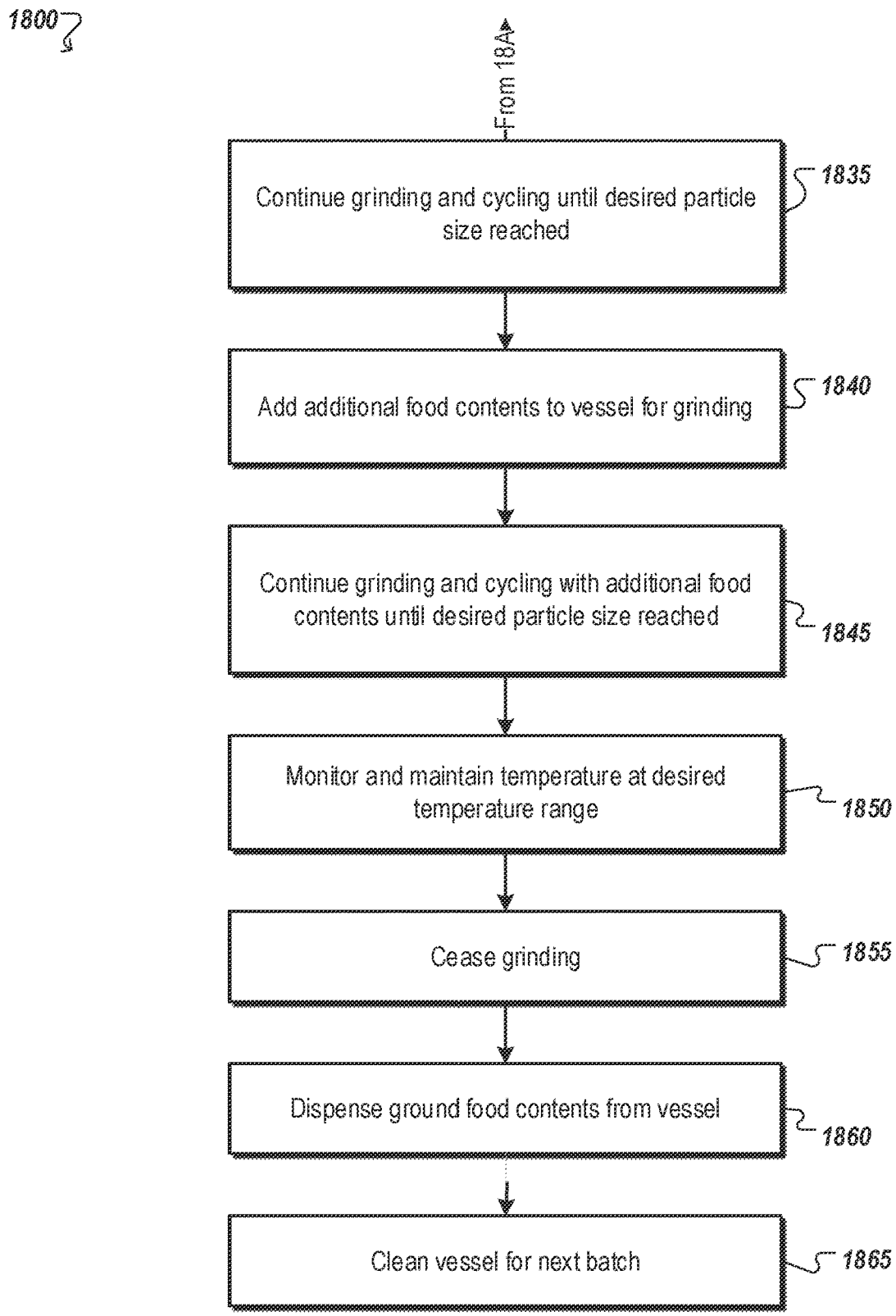

FIGS. 18A and 18B typically depict cyclic grinding process flow 1800, which typically includes steps add food contents to grinder 1805; dry at atmospheric pressure for period of time under recirculating airflow 1810; close grinder pneumatic ports 1815; grind food contents in vessel with substantial atmospheric isolation 1820; cycle pneumatic ports open when relative humidity exceeds threshold 1825; cycle pneumatic ports closed when after predetermined cycle time 1830; continue grinding and cycling until desired particle size reached 1835; add additional food contents to vessel for grinding 1840; continue grinding and cycling until desired particle size reached 1845; monitor and maintain temperature at desired temperature range 1850; cease grinding 1855; dispense ground food contents from vessel 1860; and/or clean vessel for next batch 1865. Further details regarding said process are described and given in example elsewhere in this disclosure.

In some other implementations, system 1100 components and/or subsets thereof may be made available as one or more kits. For example, such kits may include container(s) 1103, dividing members 1125, cartridges 1130, absorption media 1134, lids 1135, gaskets 1140, contents 1150, recirculation system 1300, ports 1310, lines 1320, check valves 1330, absorption vessels 1340, recirculation units 1350, bulk regenerating system 1400 (1400A-D), regeneration unit 1410, sensors 1417, valves 1420, 1430, 1440, exhaust member 1450, filters 1460, access panels 1470, and/or the like.

In some further implementations, grinding system 100 and moisture absorption system 1100 (and/or recirculating absorption system 300, active absorption system 1200, bulk recirculating system 1300, and/or bulk regenerating recirculation system 1400; referred hereafter as moisture absorption system 1100 for simplicity) may be used together.

In one such exemplary implementation, moisture-laden contents 210 (or contents 1150) may be deposited into vessel 110 (or container 1103). In some implementations, such contents 210, 1150 may be cacao nibs, which may in some implementations be preground. These contents 210, 1150 typically may, for example, have moisture content of about eight percent. Contents 210, 1150 may then be dried with moisture absorption system 1100. After this, further contents 210, 1150 may be added, such as sugar, which may have a nominal moisture content of approximately one percent. After mixing and grinding together using system 100, finished contents 210, 1150 may, for example, have a moisture content of approximately one-and-a-half percent.

In some implementations, the outgassing and moisture removal processing can result in exothermic reaction, increasing the working temperature of contents 210, 1150 and system 100, 1100. Separating these initial grind phases may, in some implementations, help to reduce thermal runaway during the moisture removal process. In some implementations, moisture may also pool at areas of the system 100, 1100 having lower temperatures, and thus system 100, 1100 may be monitored and/or volume cycled to help maintain rough temperature equilibrium during processing. In still other implementations, where the exothermic reaction rates are known (for example, one-thousand eight hundred British Thermal Units (BTUs) per mol during moisture release), this reaction rate may be accounted for and counteracted by cooling system 100, 1100 (e.g., using heat exchanger 220, slowing grinding process, etc.).

Comparatively, traditionally industry processes cacao liquor to approximately twenty to fifty microns, and then combines the processed cacao liquor with sugar, resulting in a paste-like mixture. This mixture is then crumbed and then finally conched, typically requiring multiple machines, if not entire factory lines, and many transfer steps. Such a process is highly inefficient, expensive, and cumbersome compared to the present novel technologies.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may typically be integrated together in a single product or packaged into multiple products.

Thus, while the novel technology has been illustrated and described in detail in the drawings and foregoing description, the same is to be considered as illustrative and not restrictive in character. It is understood that the embodiments have been shown and described in the foregoing specification in satisfaction of the best mode and enablement requirements. It is understood that one of ordinary skill in the art could readily make a nigh-infinite number of insubstantial changes and modifications to the above-described embodiments and that it would be impractical to attempt to describe all such embodiment variations in the present specification. Accordingly, it is understood that all changes and modifications that come within the spirit of the novel technology are desired to be protected.

What is claimed is:

1. A production method, comprising:
   a) grinding raw ingredients using a grinder over a predetermined time period at a predetermined temperature in a grinder cavity to yield ground raw ingredients;
   b) filtering ground raw ingredients;
   c) outgassing ground raw ingredients under vacuum to yield outgassed product;
   d) dispensing outgassed product;
   e) cleaning the grinder cavity;
   f) adding raw ingredients and grinding media to grinding cavity;
   g) grinding raw ingredients for approximately a predetermined number of days;
   h) absorbing moisture;
   i) maintaining temperature of raw ingredients between 90 and 105 degrees Fahrenheit; and
   j) continuing grinding process until ground raw ingredients reaches between 10 and 30 microns in size.

2. The production method of claim 1 wherein step b) further comprises
   k) evacuating ground raw ingredients from cavity;
   l) passing ground raw ingredients through a filter under a pressure of between 50 Torr and 760 Torr to yield vacuumed raw ingredients; and
   m) passing the vacuumed raw ingredients into a secondary vessel.

3. The production method of claim 1, wherein step c) further comprises the steps of:
   n) sealing ground raw ingredients in the secondary vessel;
   o) outgassing ground raw ingredients under a pressure of between 1.2 Torr and 25 Torr; and
   p) during o), agitating ground raw ingredients.

4. The production method of claim 1, wherein step d) further comprises the steps of:
   q) putting secondary vessel under ambient pressure;
   r) pressurizing outgassed ground raw ingredients; and
   s) filling containers with outgassed ground raw ingredients.

5. The production method of claim 1, wherein step e) further comprises the steps of:
   t) adding cleaning solution to cavity;
   u) enclosing cavity;
   v) agitating cleaning solution;
   w) evacuating cleaning solution; and
   x) substantially drying the grinder cavity.

6. A moisture absorption system, comprising:
   a container, wherein the container further comprises a base member, at least one side member operationally connected to, and extending from, the base member, at least one open side adjacent to the at least one side member for allowing fluidic communication with the container;
   a lid member configured to operationally connect to the at least one open side, wherein the lid member substantially seals the container from any external environment to define a vacuum-tight container volume;
   a vacuum unit operationally connected to the vacuum-tight container volume; and
   a quantity of absorption media disposed within the container for absorbing moisture from the vacuum-tight container volume.

7. The system of claim 6, further comprising:
   a dividing member disposed within the vacuum-tight container volume for dividing the vacuum-tight container volume into a first volume and a second volume.

8. The system of claim 7, further comprising:
   a drying cartridge disposed within the second volume for containing the quantity of absorption media.

9. The system of claim 6, further comprising:
   a gasket operationally connected to the lid member.

10. The system of claim 6, further comprising:
    an active circulation member disposed within the vacuum-tight container volume.

11. The system of claim 6, wherein the absorption media is a plurality of molecular sieves.

12. The system of claim 11, wherein the absorption media are sized from 1-25 angstroms.

* * * * *